United States Patent
Takamoto et al.

(10) Patent No.: US 6,748,487 B1
(45) Date of Patent: Jun. 8, 2004

(54) DISK CACHE CONTROL METHOD, DISK ARRAY SYSTEM, AND STORAGE SYSTEM

(75) Inventors: Yoshifumi Takamoto, Kokubunji (JP); Kiyohiro Obara, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/601,480

(22) PCT Filed: Feb. 4, 1998

(86) PCT No.: PCT/JP98/00463
§ 371 (c)(1),
(2), (4) Date: Aug. 3, 2000

(87) PCT Pub. No.: WO99/40516
PCT Pub. Date: Aug. 12, 1999

(51) Int. Cl.[7] .............................................. G06F 12/00
(52) U.S. Cl. ........................... 711/113; 711/4; 711/112; 711/133; 711/134; 711/136; 711/160; 711/171; 711/172
(58) Field of Search ................................ 711/113, 129, 711/171, 173, 122, 134, 112, 4, 133, 136, 158, 159, 160

(56) References Cited

U.S. PATENT DOCUMENTS

| | | | | |
|---|---|---|---|---|
| 5,390,186 A | * | 2/1995 | Murata et al. | 711/113 |
| 5,432,919 A | * | 7/1995 | Falcone et al. | 711/134 |
| 5,778,430 A | * | 7/1998 | Ish et al. | 711/133 |
| 5,781,920 A | * | 7/1998 | Takagi | 711/114 |
| 5,822,759 A | * | 10/1998 | Treynor | 711/134 |
| 5,933,853 A | * | 8/1999 | Takagi | 711/159 |
| 5,956,744 A | * | 9/1999 | Robertson et al. | 711/122 |
| 6,009,498 A | * | 12/1999 | Kumasawa et al. | 711/113 |
| 6,085,287 A | * | 7/2000 | O'Neil et al. | 711/113 |
| 6,173,362 B1 | * | 1/2001 | Yoda | 711/114 |
| 6,311,252 B1 | * | 10/2001 | Raz | 711/117 |

FOREIGN PATENT DOCUMENTS

JP 63280356 A * 11/1988 ........... G06F/12/12

* cited by examiner

Primary Examiner—Matthew Kim
Assistant Examiner—Zhuo H. Li
(74) Attorney, Agent, or Firm—Antonelli, Terry, Stout & Kraus, LLP

(57) ABSTRACT

A disk cache controlling method and a disk array system which includes a plurality of disk devices and a disk cache. Data is divided and stored into the disk devices and a plurality of volumes are assigned to the disk devices. A disk array controller controls the disk devices. Assignment of new disk cache areas includes dividing each of the volumes into areas with an arbitrary fixed length, determining an access frequency for each of the divided areas of each of the volumes; and changing assignment of the disk cache areas to the divided areas according to an access frequency for each divided area. The disk cache areas are assigned to the divided areas according to a divided area having an access frequency which is the lowest.

37 Claims, 21 Drawing Sheets

FIG. 7

CACHE MANAGEMENT TABLE

| VOLUME | CACHE AREA NUMBER | CACHE IN |
|---|---|---|
| 1 | 0 | 0 |
| 1 | 1 | 0 |
| 1 | 2 | 1 |
| 1 | 3 | 0 |
| 1 | 4 | 0 |
| 1 | 5 | 1 |
| 1 | 6 | 0 |
| 1 | 7 | 0 |
| ... | ... | ... |
| 2 | 0 | 0 |
| 2 | 1 | 1 |
| 2 | 2 | 0 |
| 2 | 3 | 0 |
| 2 | 4 | 0 |
| 2 | 5 | 1 |
| 2 | 6 | 1 |
| 2 | 7 | 1 |
| ... | ... | ... |

ACCESS CHARACTER TABLE

| VOLUME | AREA NUMBER | ACCESS FREQUENCY |
|--------|-------------|------------------|
| 1 | 0 | 0 |
| 1 | 1 | 10 |
| 1 | 2 | 20 |
| 1 | 3 | 20 |
| 1 | 4 | 20 |
| 1 | 5 | 19 |
| 1 | 6 | 20 |
| 1 | 7 | 3 |
| ... | ... | ... |
| 2 | 0 | 0 |
| 2 | 1 | 0 |
| 2 | 2 | 30 |
| 2 | 3 | 40 |
| 2 | 4 | 40 |
| 2 | 5 | 0 |
| 2 | 6 | 0 |
| 2 | 7 | 0 |
| ... | ... | ... |

901   902   903

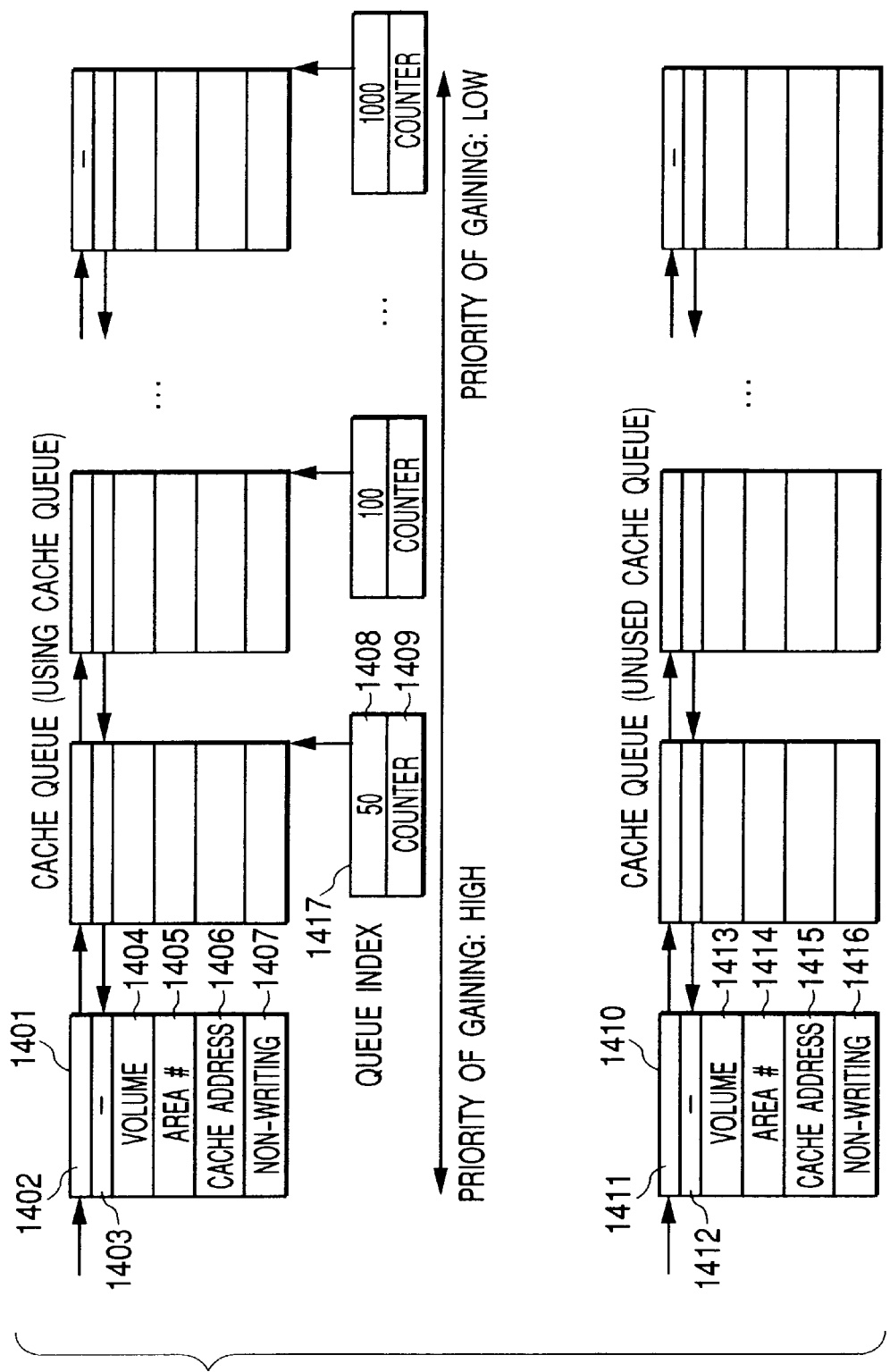

FIG. 24

ACCESS CHARACTER TABLE

| APPLICATION ID | ACCESS CHARACTER | VOLUME | AREA NUMBER | ACCESS FREQUENCY |
|---|---|---|---|---|
| 0 | RANDOM | 1 | 0 | 0 |
| | | 1 | 1 | 10 |
| | | 1 | 2 | 20 |
| | | 1 | 3 | 20 |
| | RANDOM | 2 | 4 | 20 |
| | | 2 | 5 | 19 |
| | | 2 | 6 | 20 |
| | | 2 | 7 | 3 |
| | | ... | ... | ... |
| 1 | SEQUENTIAL | 3 | 0 | 0 |
| | | 3 | 1 | 0 |
| | | 3 | 2 | 30 |
| 2401 | 2402 | 2403 | 2404 | 2405 |

DISK CACHE CONTROL METHOD, DISK ARRAY SYSTEM, AND STORAGE SYSTEM

BACKGROUND OF THE INVENTION

The present invention relates to a cache controlling method in a disk array. In particular, it relates to an efficient caching control in correspondence with the access of an application.

A magnetic disk device with a high cost performance is generally used as a device for storing computer data. The magnetic disk has a mechanism by which data is read and written by a plurality of magnetic disks about 2.5 or 3.5 inches in diameter and magnetic heads provided on the both sides of each magnetic disk.

The magnetic disk is accompanied by mechanical movements. Accordingly, its processing time is equal to about 10 m seconds, which is slow in comparison with the processing speed of a processor. There are many cases where, even if the processor is speeded up, no entire system performance is enhanced unless the magnetic disk is speeded up. In order to speed up the magnetic disk and solve this problem, a disk cache is generally used. As explained in "Understanding I/O Subsystems First Edition", W. David Schwaderer, Andrew W. Wilson, Jr., pp. 253–261, the disk cache is the following speeding up system: Data stored in the magnetic disk (hereinafter, abbreviated as a drive) are stored into a high-speed semiconductor memory (the disk cache) provided within a controller for controlling the drive. Then, if data requested from a host exists in the disk cache, no access to the drive is executed and instead the data within the disk cache is transferred to the host, thereby speeding up the drive access. Also, at the time of writing data, the writing-completion notice is sent to the host at the time when the data from the host has been written into the disk cache. Moreover, when the disk controller is in an idle state or at a fixed interval, the data written into the cache is further written into a predetermined place in the drive. Also, in such cases as a sudden power-supply breakdown, the data is protected by a battery so that the data is not lost. The disk cache has an effect of speeding up both a data-writing process and a data-reading process. The disk cache, however, includes the semiconductor memory that is more expensive than the drive. As a result, it is impossible for the disk cache to store all the data within the drive. For example, as compared with an entire drive capacity of 700 GB, a capacity of the disk cache is equal to about 4 GB, which is only about 1% of the entire drive capacity. In a state where data have been already stored in all the areas of the disk cache, when further storing new data into the disk cache, it is requited to expel any of the data stored in the disk cache. When the expelling of the data has been completed, the data to be newly stored is written into the area from which the old data has been expelled. This operation is referred to as "cache replace". As this cache replace method, FIFO (First In First Out) method and LRU (least recently used) method are explained in "Understanding I/O Subsystems First Edition", W. David Schwaderer, Andrew W. Wilson, Jr., pp. 253–261. The FIFO method is a first-in first-out method by which the data are expelled in order from the oldest data. The FIFO has an effect in the case of an access characteristic that the data are accessed sequentially. The FIFO, however, is not suitable for a random access characteristic since the data are expelled regardless of a height of the access frequency. For example, even if there is contained data that is accessed frequently, all the data are expelled in order in the FIFO method. This condition reduces a possibility that the data accessed frequently still remains at the time of the next access. On account of this, the LRU method is often used for performing the cache control. The LRU is a method in which, when all the disk cache areas are already in use and it becomes required to assign any of the disk cache areas for the other data, a cache area having the lowest access frequency is reused and assigned first. Accordingly, in the LRU method, the data having a higher access frequency becomes likely to remain in the disk cache. This condition makes it possible to enhance a hit rate of the disk cache in comparison with the FIFO. In addition to the disk cache field, the LRU method is used over wide range of fields such as an instruction cache within the processor and a buffer control in the database system. The reason why the LRU is used widely is that the LRU allows the control corresponding to the access characteristic and results in a lower control overhead. The LRU method can be expected to exhibit an effect when the access to the cache has been stabilized. However, when the access to the cache is changed dynamically, the LRU method is unable to control the cache very well. This is due to the fact that, since the access characteristic is changed dynamically, a shift occurs between sampling of the access frequency and the control of the disk cache. In order to solve this problem, in JP-B-7-99508, there is disclosed a disk cache controlling method that is made possible to respond to and deal with the dynamical change by combining a steepest descent method with a disk cache miss rate function. The disk cache controlling method is a method in which, using the steepest descent method and the disk cache miss rate function, the area-dividing with which the disk cache is used is varied so that a disk cache miss rate becomes its minimum.

Meanwhile, other than the disk cache, a disk array can be mentioned as a member of speeding up the drive. As explained in "Understanding I/O Subsystems First Edition", W. David Schwaderer, Andrew W. Wilson, Jr., pp. 271–291, the disk array is the following system: Data are located in a plurality of drives in a distributed manner, and at the same time the redundant data are also stored in the drives, thereby enhancing the performance and the reliability. The disk array is used in a large-scale system, because all the requested drive capacity becomes larger and the performance and the reliability are requested simultaneously. The use of the disk array has enhanced the capacity, the performance, and the reliability. This has increased an access case where a large number of application programs are concentrated on a single disk array controller. In this case, it turns out that a single disk cache area is used in a competitive manner by the plurality of applications.

The LRU method, which is employed at present as a standard method of performing the cache control, uses only the access frequency for the cache control. As a result, in such an environment that the disk array is used, i.e., a plurality of applications operate in a multiplexed manner, the LRU method is unable to perform the efficient cache control. For example, assume the following case: There exist two JOBs having different access characteristics, and JOB 1 accesses local disk areas and JOB 2 accesses wide range of disk areas, and their access frequencies are equal to each other. In this case, because of the same access frequencies, the LRU method assigns almost the same disk cache area to the two JOBs. The JOB 2, however, accesses the wide range of disk areas. This condition lowers an enhancement rate of the hit rate even if the disk cache area is assigned, thus resulting in an inefficient cache control as a whole. Also, the disk cache controlling method disclosed in JP-B-7-99508 is able to respond to and deal with, to a certain extent, the case such as the disk array where a plurality of applications operate simultaneously. In the controlling method, a disk cache area is divided into a plurality of cache pools, and a size of each cache pool is adjusted using the disk cache miss rate function and the steepest descent method so that the miss rate becomes small, thereby enhancing the disk cache hit rate. In the disk cache controlling method disclosed in JP-B-7-99508, the cache is increased or decreased in a unit of the cache pool having a large capacity. When a plurality of applications use the same cache pool simultaneously, the large management unit averages accesses from the plurality of applications, thereby making it impossible to detect the exact access characteristics. For example, in cases where applications making a local access and applications making a wide range of access are mixed together, the accesses are averaged. This condition causes a control to be performed that is the same as the control of an intermediate range of access, thus resulting in a problem that the optimum cache control becomes impossible. Also, the size-adjustment of each cache pool necessitates the number of the operations that is proportional to the square of the number of the cache pools. This gives rise to a problem that the overhead is increased to such an extent that the disk cache capacity and the disk system become large-scaled. Also, there exists a problem that it is impossible to follow and deal with a sudden change of an access. For example, when an access to a cache pool having an exceedingly high hit rate is suspended on account of reasons such as termination of the application, it is not so easy to perform a control of depriving the area. This is due to the fact that, since the disk cache controlling method is based on a change in the miss rate, it is difficult to accurately grasp a time change in the access characteristic in the case where there occurs no change in the miss rate.

SUMMARY OF THE INVENTION

In the present invention, in order to solve the above-described problems, the following control is performed: The distribution of an access frequency is detected. Then, the control is performed so that more of cache areas are assigned to a volume where the distribution of the access frequency is localized. Conversely, in the case of a volume where the access frequency is distributed over a wide range, the control is performed so that no cache area is assigned thereto. Concretely speaking, there is provided a member of dividing the area of a volume into areas having an arbitrary fixed length, and determining the access frequencies for the respective divided areas, and depriving at first, with the highest priority, the cache area in which the area having the lowest access frequency is stored.

BRIEF DESCRIPTION OF DRAWINGS

FIG. 7 illustrates a disk array reading program flow in the embodiment 1 of the present invention;

FIG. 10 illustrates the configuration of an access character table in the embodiment 1 of the present invention;

FIG. 14 illustrates the configuration of a cache queue in the embodiment 1 of the present invention;

FIG. 24 illustrates the configuration of an access character table in the embodiment 3 of the present invention.

DETAILED DESCRIPTION OF THE INVENTION

Embodiment 1

Hereinafter, illustrating the drawings, the explanation will be given in further detail concerning an embodiment 1 of a disk cache controlling method related to the present invention.

Figure 1:
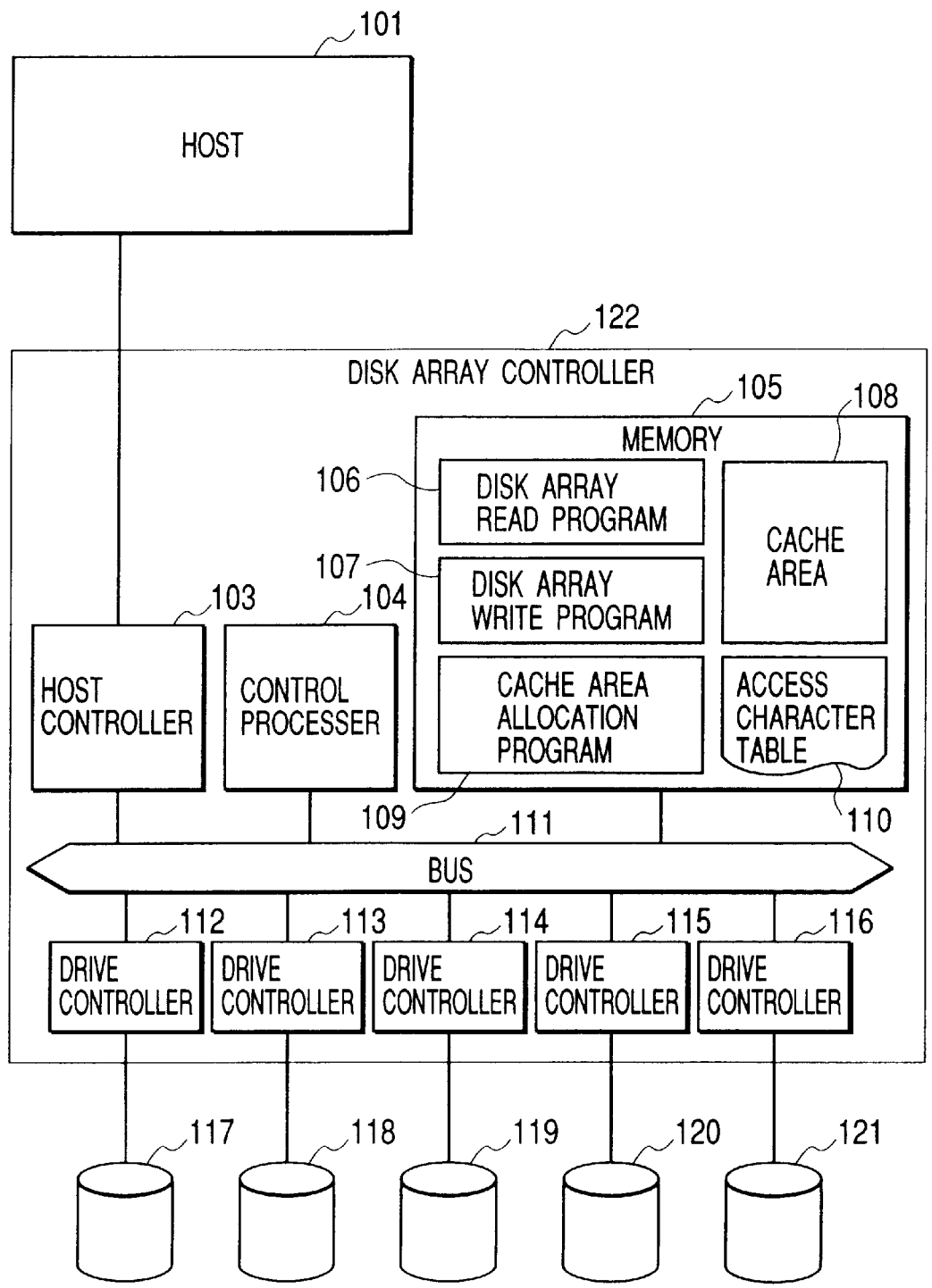
FIG. 1 illustrates an entire configuration diagram in an embodiment 1 of the present invention.

FIG. 1 illustrates a schematic configuration diagram of a computer system to which the disk cache controlling method according to the present invention is applied. The reference numerals denotes the following, respectively: 101 a host processor, 122 a disk array controller, 117~121 drives connected to the disk array controller 122. When the host 101 issues an input/output request to the disk array controller 122, the disk array controller 122 interprets the input/output request, then performing the input/output toward the predetermined drives 117~121. The disk array controller 122 includes, in further detail, a host controller 103, a control processor 104, a memory 105, drive controllers 112–116, and a bus 111 for connecting these components. The host controller 103 performs a reception of the input/output request issued from the host 101 and a control of informing the host 101 that a processing is completed. The drive controllers 112–116, which are connected to the drives 117–121, perform input/output controls of data toward the drives. The host controller 103 and the drive controllers 112–116, to which the control processor 104 issues a start/end instruction and a data transfer instruction, operate in accordance with the instructions. The operation of the control processor 104 is described in programs and tables stored in the memory 105. A disk array read program 106 is a control program for controlling the input request issued from the host 101. A disk array write program 107 is a control program for controlling the output request issued from the host 101. A cache area allocation program 109 performs the assignment of cache area 108 for storing data. An access character table 110 stores information about characteristics of the input/output issued from the host 101. The cache area is an area for temporarily storing data read from the drives 117–121. When the host 101 requests a reading of the same data once again, the data is sent back from the cache areas 108 to the host 101. This operation makes it possible to speed up the input/output response. Also, if a writing request occurs from the host 101, the cache area 108 is used for temporarily holding therein the data to be written. The writing-completion report is sent to the host 101 at the time when the data has been stored into the cache area 108. This operation can make the writing look like being performed at a high-speed. Concerning a writing of data from the cache areas 108 into drives 117–121, when the data is expelled from the cache areas 108, or by a writing processing that starts up every regular time interval, the data is written into the disks 117–121.

Figure 2:
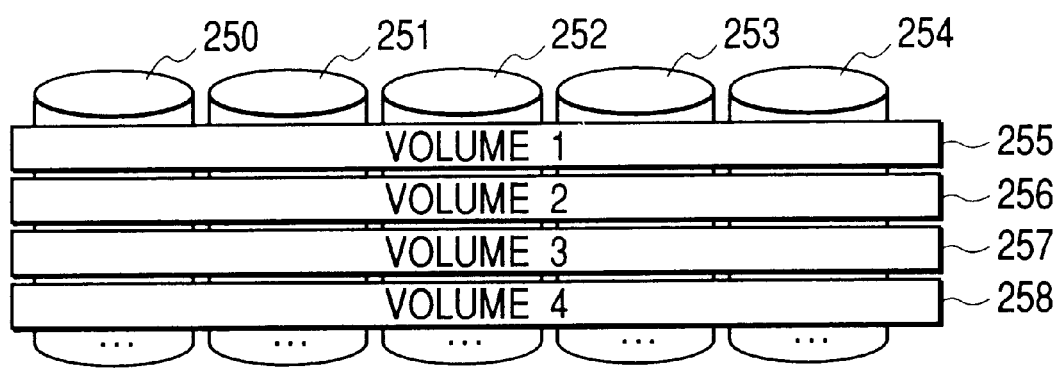
FIG. 2 illustrates the relationship between drives and volumes in a disk array in the embodiment 1 of the present invention.

FIG. 2 illustrates the relationship between the drives and volumes in the disk array. The disk array controls the plurality of drives. A volume means a unit of the areas that the host manages. In the disk array, in order to enhance a parallel operational performance of the plurality of drives, it is usual to employ the case where the volume is divided in the direction that is horizontal to the plurality of drives. In FIG. 2, reference numerals 250–254 denote the drives and numerals 255–258 denote the volumes, i.e., the management units by the host. By locating the volumes (255–158) over the d rives (250–254), it becomes possible to enhance the parallel operational performance of the plurality of drives (250–254) even if an access is made to whatever volume.

Figure 3:
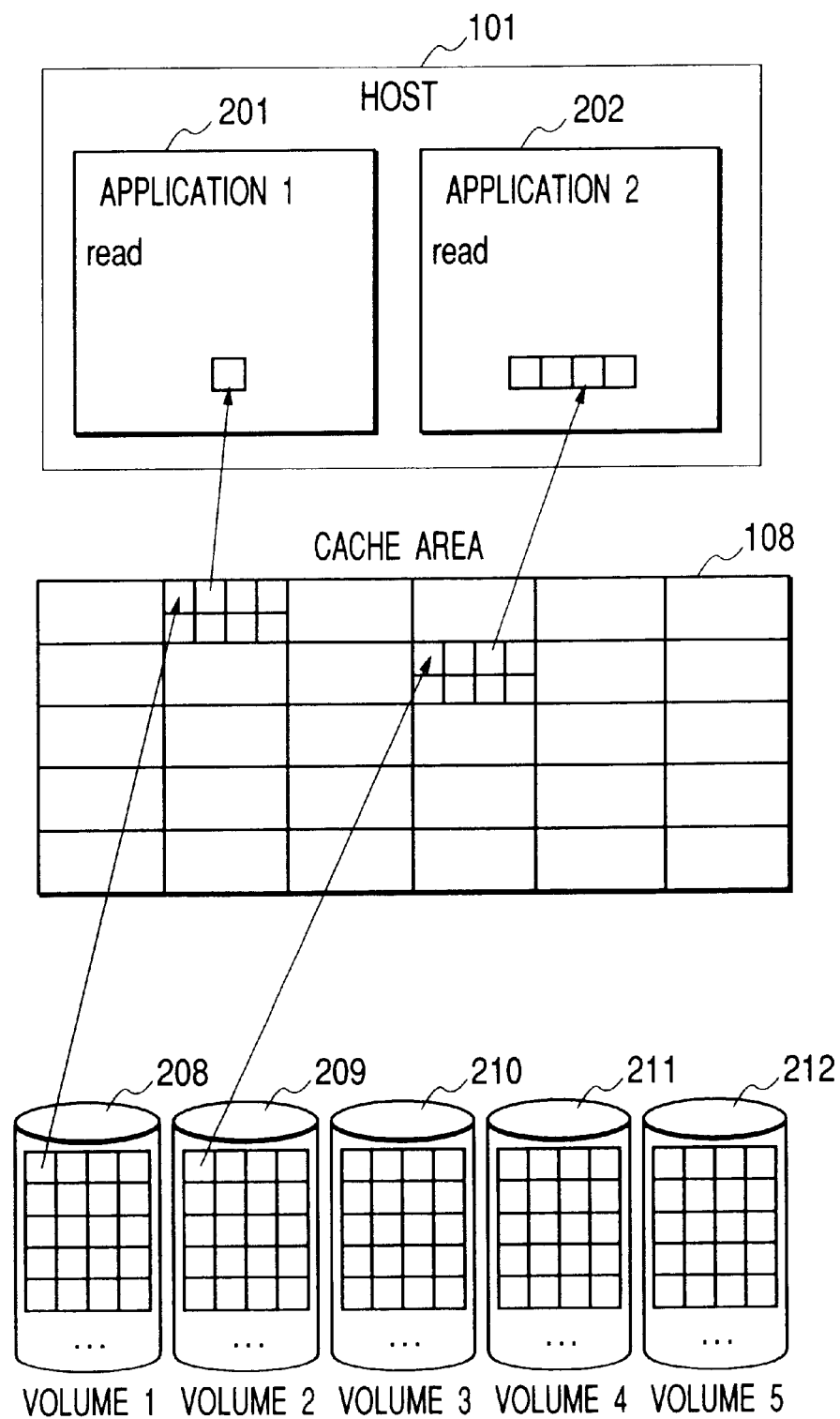
FIG. 3 illustrates a method of using cache areas.

FIG. 3 illustrates the basic operation of the cache areas 108. Within the host 101, there is illustrated a situation where an application 1 (201) and an application 2 (202) are started up simultaneously. If data that the application I (201) and the application 2 (202) have requested are not stored in the cache area 108, the data are read out from predetermined volumes 208–212 and are stored into the cache area 108, then being transferred to the respective applications. A n input/output unit of the volumes 208–212 and of the host 101 is 512 bytes. 4 K bytes, whereas an input/output unit of the cache area 108 is about 64 K bytes. The purposes of the large input/output unit of the cache area 108 are to prevent the performance of the cache hit retrieval from being decreased and to decrease the capacity of the management area. Consequently, when the cache miss is committed or when the data are expelled from the cache area 108 into the disks, these are performed in a 64K-byte unit. This operation is referred to as "staging". The unit of the staging is larger than the input/output unit of the host 101. As a result, it turns out that, at the time of the staging, data other than the data that the host 101 has requested are also subjected to the staging simultaneously. This, in the case of the sequential access, becomes a precedence reading effect or a batch writing effect, thereby making a contribution to the speeding-up.

Figure 4:
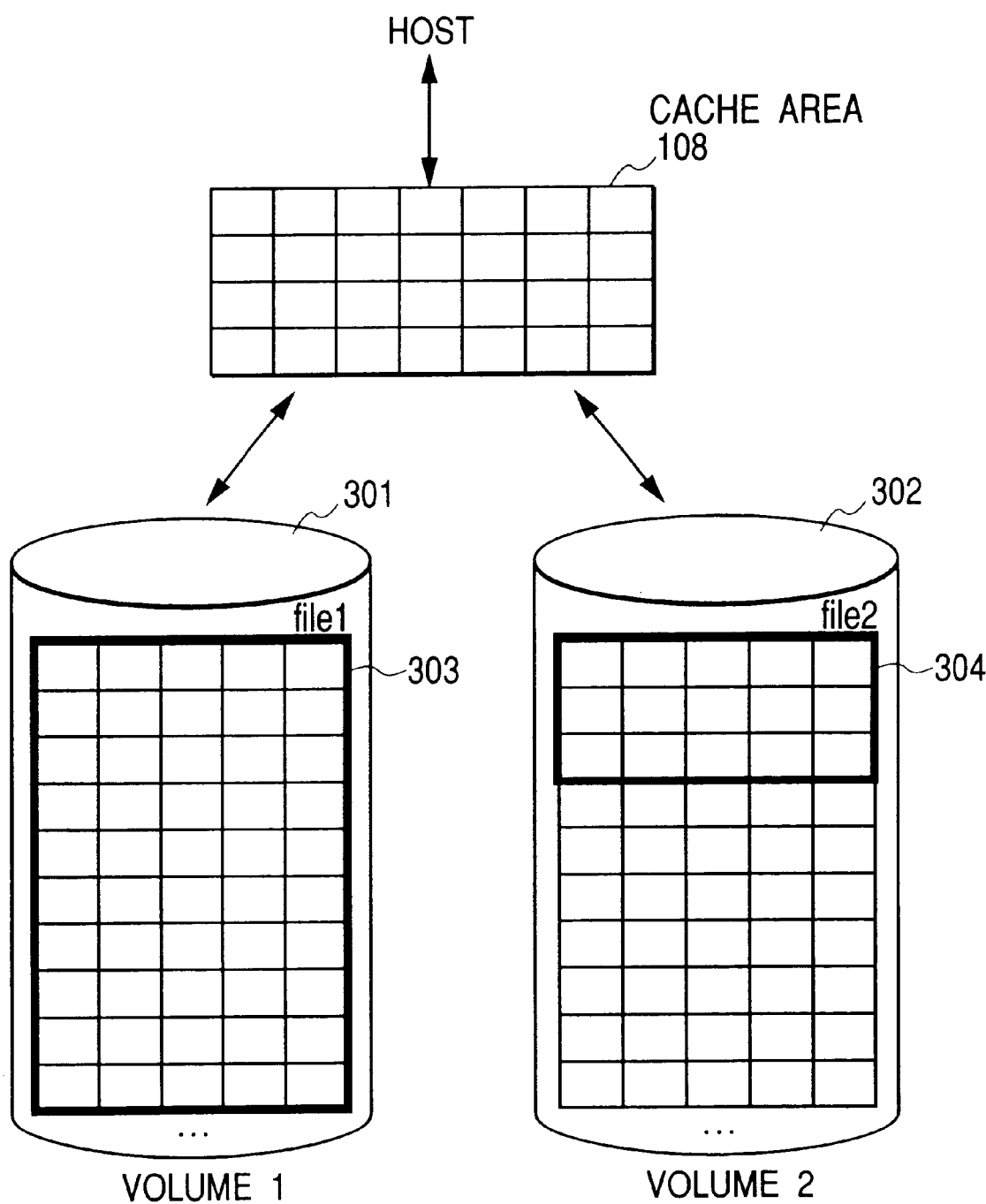
FIG. 4 illustrates the volumes in the case where the file capacities differ from each other.
Figure 5:
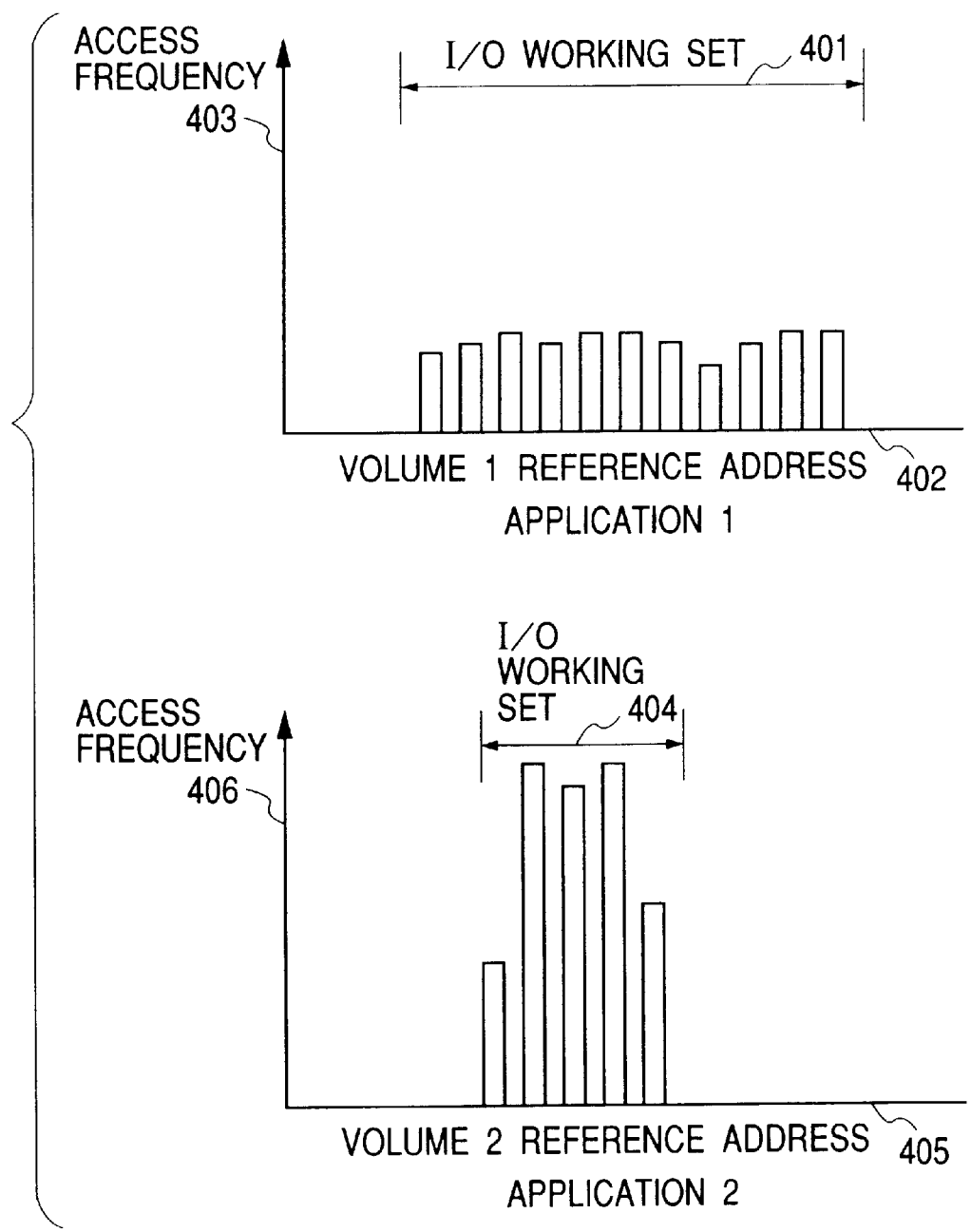
FIG. 5 illustrates two types of access characteristics in which I/O working sets differ from each other.

FIG. 4 and FIG. 5 illustrate an example where, when an access to a plurality of volumes is controlled in a single cache area, a bias occurs in the access. As a typical example where the bias occurs, as illustrated in FIG. 4, the case can be considered where, concerning a file 1 (303) and a file 2 (304) that are assigned to a volume 1 (301) and a volume 2 (302), a capacity of the file l and that of the file 2 differ from each other. At the time when the capacity of the file 1 (303) is larger than that of the file 2 (304), and both the file 1 (303) and the file 2 (304) are random-accessed, and their access frequencies, i.e., the numbers of the inputs/outputs accessed per unit of time, are equal to each other, the resultant access distributions are given as illustrated in FIG. 4. FIG. 5 illustrates the access frequencies for each volume address of the volume 1 (301) and the volume 2 (302) to which the file 1 (303) and the file 2 (304) in FIG. 4 have been assigned. Numerals 402, 405 denote reference addresses of the volume 1, the volume 2, and numerals 403, 406 denote the access frequencies per unit of time. The volume 1 (301) is accessed over a wide range since the capacity of the file 1 (303) is large, and the volume 2 is localized since the capacity of the file 2 (304) is small. When the bias like this occurs, the conventional caching control method is unable to perform an effective caching. Since conventionally, the LRU (least recently used) method has been employed in the caching of the random-accessed data. In the LRU method, when all the cache area parts are already in use and it becomes required to assign any of the cache area parts for the other data, a cache area part having the lowest access frequency is reused first. In the conventional method, at the time when the disk cache hit rates of both the volume 1 (301) and the volume 2 (302) are not extremely high and the access frequencies for each volume of the volume 1 (301) and the volume 2 (302) are equal to each other, a capacity of the cache area assigned to the volume 1 (301) and that of the cache areas assigned to the volume 1 (301) become substantially equal to each other. Many of the cache area parts (108) have been assigned to the area as well where the access frequency is distributed over a wide range and the disk cache hit rate is considered to be low, which is the problem in the conventional method. In the present invention, the control is performed so that more of the cache area is assigned to the volume 2 (302) where the distribution of the access frequency is localized, thereby enhancing the cache hit rate of the entire system. Namely, the method according to the present invention is that the cache capacity assigned to a wide I/O working set (401) such as the volume 1 (301) is lowered and more of the cache area is assigned to the area where an I/O working set (404) is narrow and the hit rate can be expected to increase.

Figure 6:
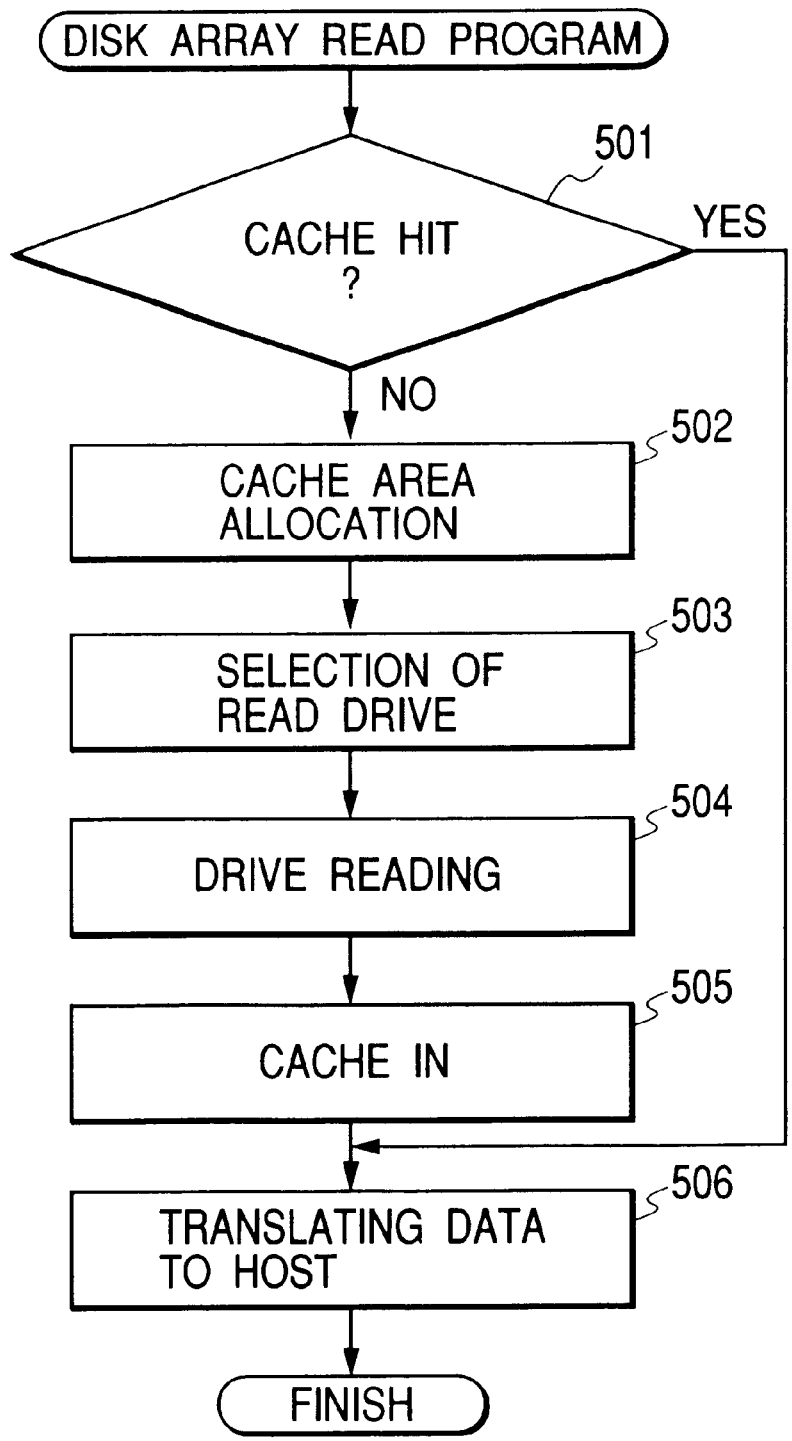
FIG. 6 illustrates a cache management table in the embodiment 1 of the present invention.

FIG. 6 illustrates the processing flow of a disk array read program. At a step 501, it is checked whether or not data to be read is stored in a cache area 108. A cache management table illustrated in FIG. 7 is used for this checking. Within the cache management table, there are stored volume names 601, area numbers 602, and cache storage states 603. The volume names indicate the volumes that the disk array controller 122 manages. The area numbers are identifiers of areas obtained by separating the respective volumes in the same size as the management unit of the cache. The cache storage states are flags for indicating whether or not the areas are stored in the cache. The cache management table stores, per size of the cache management unit, information about all the volumes that the disk array controller manages. This is intended to speed up the retrieval of the cache. When a volume name and a reading address are provided from the host, using the volume name first, the areas of the cache management table are focused on an area of the volume name. Then, if the reading address is indicated by the number of the bytes from the top, a value obtained by dividing the number of the bytes by the cache management unit is equivalent to the corresponding area number 602. A simple calculation using the area number makes it possible to check whether or not the data to be read is stored in the cache area 108. If the state is a cache hit state where the requested data is stored in the cache area 108, proceed to a step 506, and if the state is a hit miss state, proceed to a step 502. At the step 502, a cache area allocation program is started so as to ensure an area for storing the requested data in the cache area 108. The cache area allocation program will be explained in detail later. At a step 503, a drive is selected from which the data requested from the host should be read. At a step 504, the requested data is read out from the drive specified at the step 503. At a step 505, the data read out at the step 504 is stored into the cache area allocated at the step 502 or into the cache area 108 that has been allocated already. At a step 506, the requested data stored in the cache area 108 is transferred to the host, thereby terminating the processing.

Figure 8:
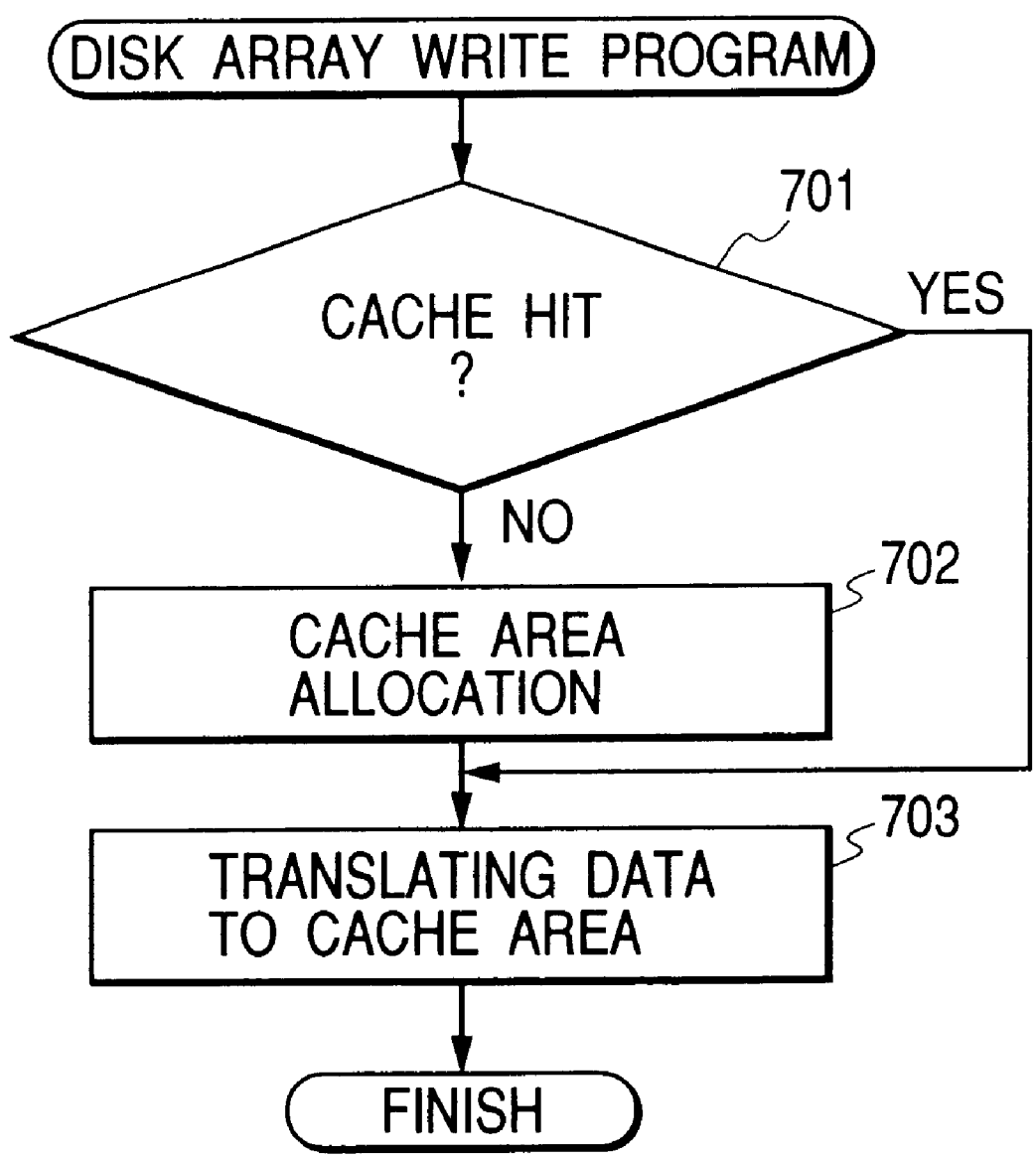
FIG. 8 illustrates a disk array writing program flow in the embodiment 1 of the present invention.

FIG. 8 illustrates the processing flow of a disk array write program. At a step 701, it is checked whether or not data to be read is stored in a cache area 108. This checking is performed in the same method as that at the step 501. At a step 702, the cache area allocation program is started so as to ensure an area for storing data to be written in the cache areas 108. The cache area allocation program will be explained in detail later. At a step 703, the data to be written is transferred into the area ensured at the step 702 or into the area that has been ensured already, thereby terminating the processing. In order to speed up the writing processing, the writing into the drive is delayed. Although not illustrated, unwritten data that has not yet written into the drive is checked every ten seconds. If there exists the unwritten data, its writing processing into the drive is executed in the background.

Figure 9:
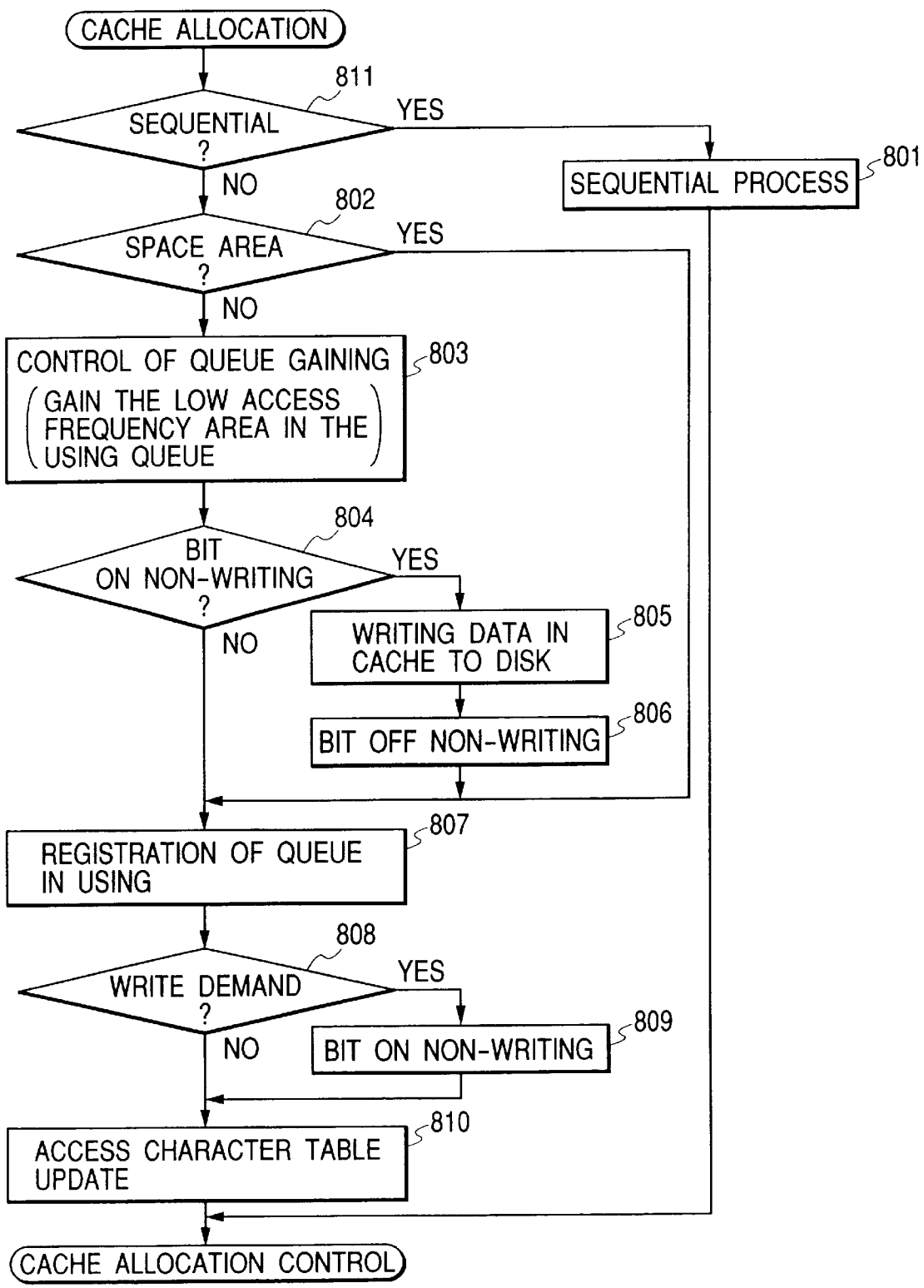
FIG. 9 illustrates a cache assigning flow in the embodiment 1 of the present invention.

FIG. 9 illustrates the processing flow of the cache area allocation program. At a step 81 1, it is judged whether or not the input/output request is a sequential access. The judgment can be achieved by judging whether or not the address reference is a continuous volume address reference from the access history in the past. If the input/output request is the sequential access, at a step 801, a sequential processing is performed. In the sequential processing, the control is performed so that not many of the cache area parts 108 are allocated to the sequential access. Concretely, only the area of the several numbers of the cache management units are allocated. This is due to the fact that the sequentially-accessed data are seldom reused. The sequential access has a high access frequency and accordingly, without performing this control, so many of the cache area parts 108 are used. It is inefficient to assign the large number of cache area parts 108 to the access having a little possibility of being reused. Rather, it is efficient to allocate only the several numbers of cache management units to the sequential access like the one at the step 801. The purpose of allocating the several cache management units is to use the units as areas for the precedence reading or the batch writing. In the case of the sequential access, after executing the step 801, the processing is terminated. Consequently, the update of the access character table, which will be explained later, is not performed. In the case where it is judged that the input/output request is not the sequential access, proceed to a step 802 and it is judged whether or not there exists an empty area (an unused area) in the cache areas 108. When there exists the empty area, proceed to a step 807, and when there exists no empty area, proceed to a step 803. At the step 803, a cache area having the lowest access frequency per unit area is deprived out of in-use cache queues. At a step 804, it is judged whether or not data in the deprived area is unwritten. The unwriting of the data means a state where the newest data exists on the cache area 108 and has not yet written into the drive, and the unwritten data means the data not yet written into the drive. The unwritten data is generated when the writing is performed from the host. If the data in the deprived area is the unwritten data, proceed to a step 805 and the writing into the disk is performed. At a step 806, an unwritten bit is off for the next use. At a step 807, the cache area ensured at the step 803 or from the empty area is registered into the in-use queues. At a step 808, it is judged whether the request is a writing or a reading. If the request is the writing, the unwritten bit is on. Otherwise, proceed to a step 810 and at the step 810, the update of the access character table is performed.

Figure 11:
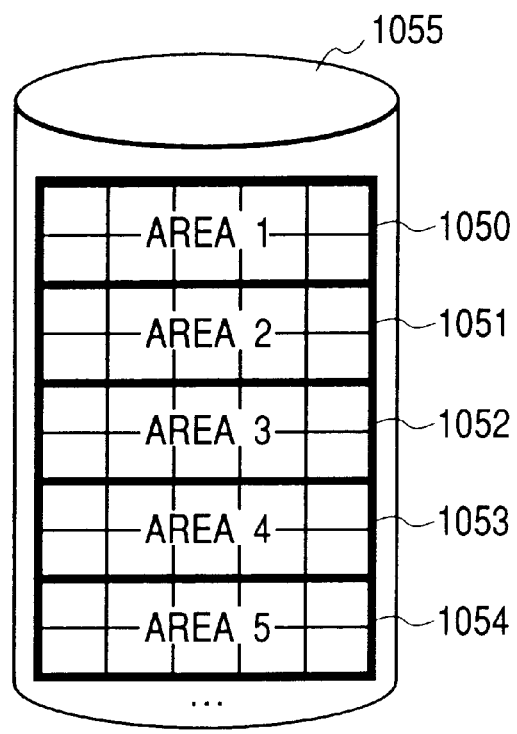
FIG. 11 illustrates management areas in the access character table in the embodiment 1 of the present invention.
Figure 13:
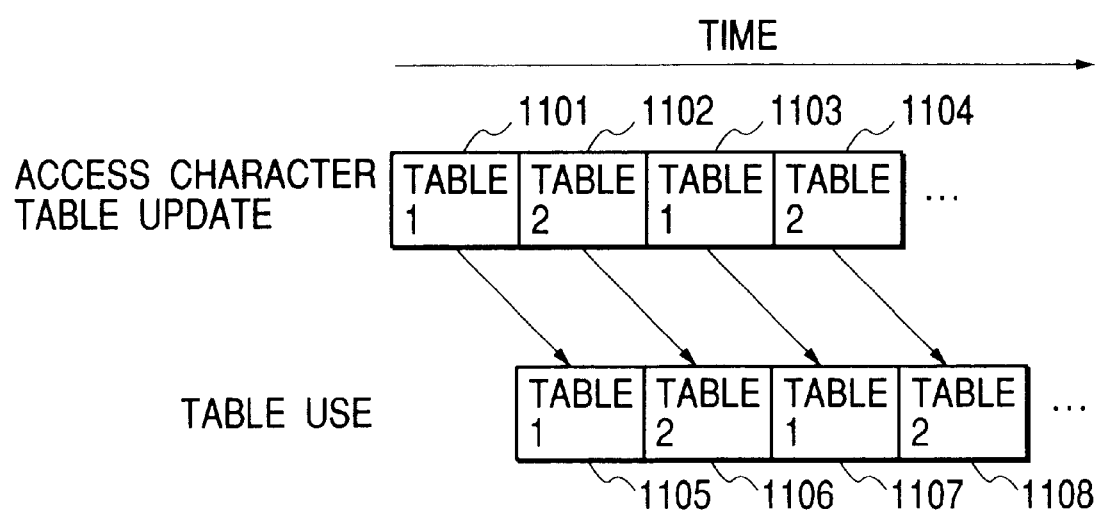
FIG. 13 illustrates an access character table changing method in the embodiment 1 of the present invention.
Figure 12:
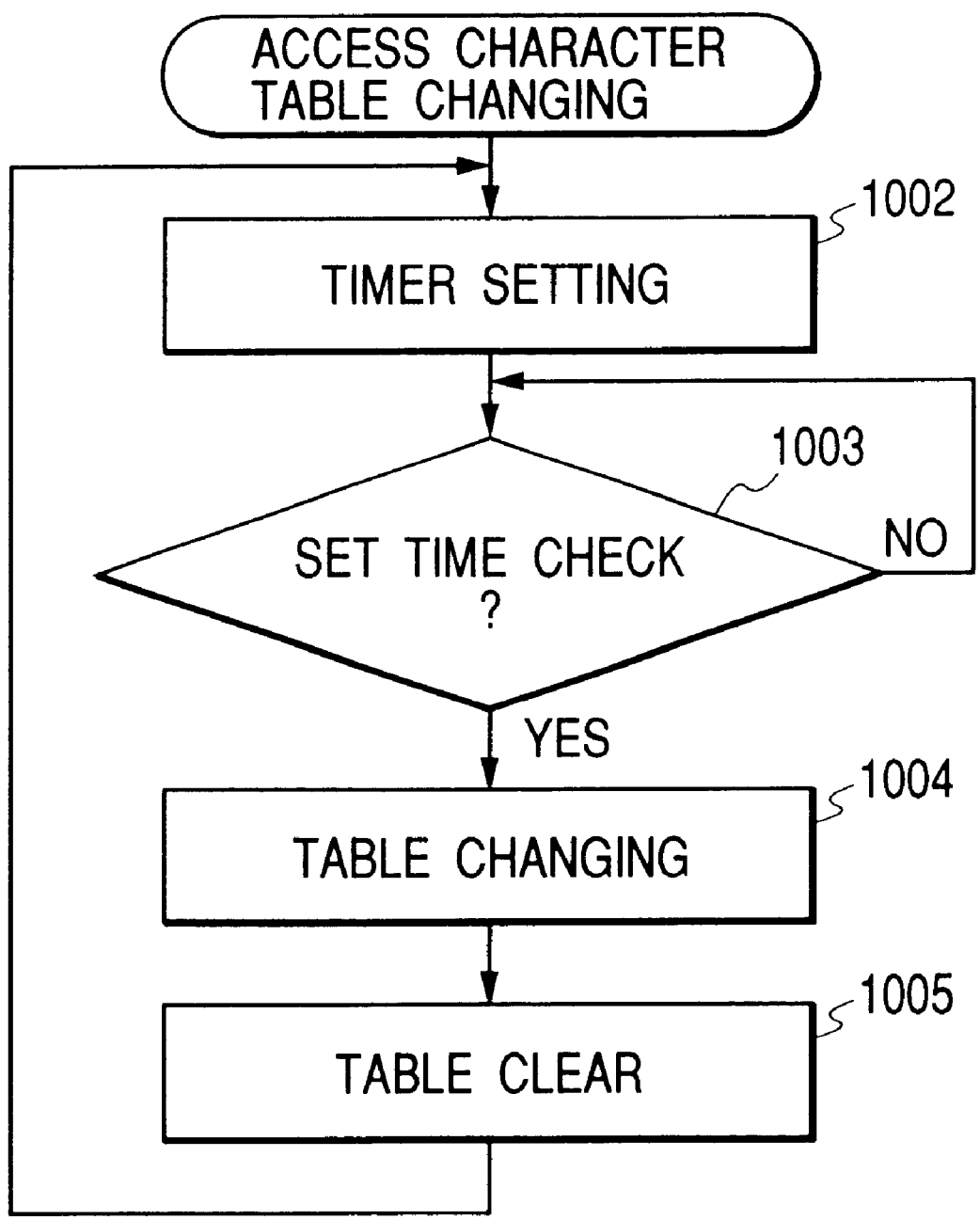
FIG. 12 illustrates an access character table changing flow in the embodiment 1 of the present invention.

FIG. 10 illustrates the structure of the access character table. The access character table is a table for detecting the I/O working sets. The present table includes volume names 901, area numbers 902 obtained by separating the volume area in an arbitrary unit, and access frequencies 903 for each area number. As illustrated in FIG. 11, the area numbers 902 are obtained by separating a volume 1055 into arbitrary areas (1050–1054) having a fixed length. As described later, the areas (1050–1054) are a unit for sampling the access frequencies. There is illustrated an example where the access characteristics of the volume 1 and the volume 2 illustrated in FIG. 5 undergo mapping and are mapped to the present access character table. The volume 1 is of the access characteristic having the wide range of I/O working set and the volume 2 is of the access characteristic having the narrow range of I/O working set. In the access character table, by sampling the access frequencies for the respective areas separated in the arbitrary unit, i.e., for example, 100 MB, these access characteristics are represented in the following manner: In the case of the wide range of I/O working set such as the volume 1, the sampled values turn out to become smaller, and conversely, in the case of the narrow range of I/O working set such as the volume 2, the sampled values turn out to become larger. Eventually, it has been found that, as the sampled values become larger, the corresponding access characteristic has the higher access frequency and the smaller I/O working set. Although the conventional LRU method has allowed only the height of the access frequency to be detected, providing the present access character table makes it possible to detect the magnitude of the I/O working set as well as the height of the access frequency. Also, two or more of the access character tables are provided and access character tables for sampling the access frequency and access character tables used for controlling the cache are switched to each other every time a fixed length of time has been elapsed. This allows the cache controlling method to respond to and deal with the dynamically changing access. FIG. 12 illustrates this processing flow. At a step 1002, a timer is set. The time interval in terms of which the access character tables are switched, for example, 1 second, is set. In the case where the timer is counted down and is stopped when it comes to indicate 0 second, at a step 1003, by judging whether or not the timer indicates 0 second, it is possible to know whether or not the specified time has been elapsed. At a step 1004, the access character tables are switched to each other, and the access character tables used at present are switched to the access character tables that have sampled new access characteristics. At a step 1005, in order to start sampling the access characteristics newly, the content of the access character tables used until then is cleared up. As illustrated in FIG. 13, this makes it possible to switch, every time the fixed length of time has been elapsed, access character tables (1105–1108) used for controlling the cache and access character tables (1101–1104) for updating the access characteristic. In the case where there exists only one access character table and it continues sampling the access characteristic, only the accumulated values are obtainable. On this occasion, if the access characteristic is changed dynamically, it becomes impossible to detect the exact access characteristic. Also, in the case where there exists only one access character table and the access characteristic is cleared up every time the fixed length of time has been elapsed, it is possible to respond to and deal with, to some extent, the change in the access characteristic. However, immediately after starting to sample the access characteristic after being cleared up, it is impossible to detect the exact access characteristic. In the case of providing the two or more of access character tables and executing the processing flow in FIG. 12, it becomes possible to sample the access characteristic in a stable condition. Also, in the controlling method of the present embodiment, sampling the access characteristic for each volume allows the access characteristic to be detected without modifying an interface between the host 101 and the disk array controller 122. None of the existing disk interfaces is capable of recognizing in what operation an application is performing. Consequently, it becomes necessary for the disk array controller 122 to anticipate the operation of the application working on the host from the volume names and the volume addresses. In the embodiment 1, this anticipation is implemented by sampling the access characteristics for the respective volumes and the respective areas partitioned in the arbitrary size.

Figure 15:
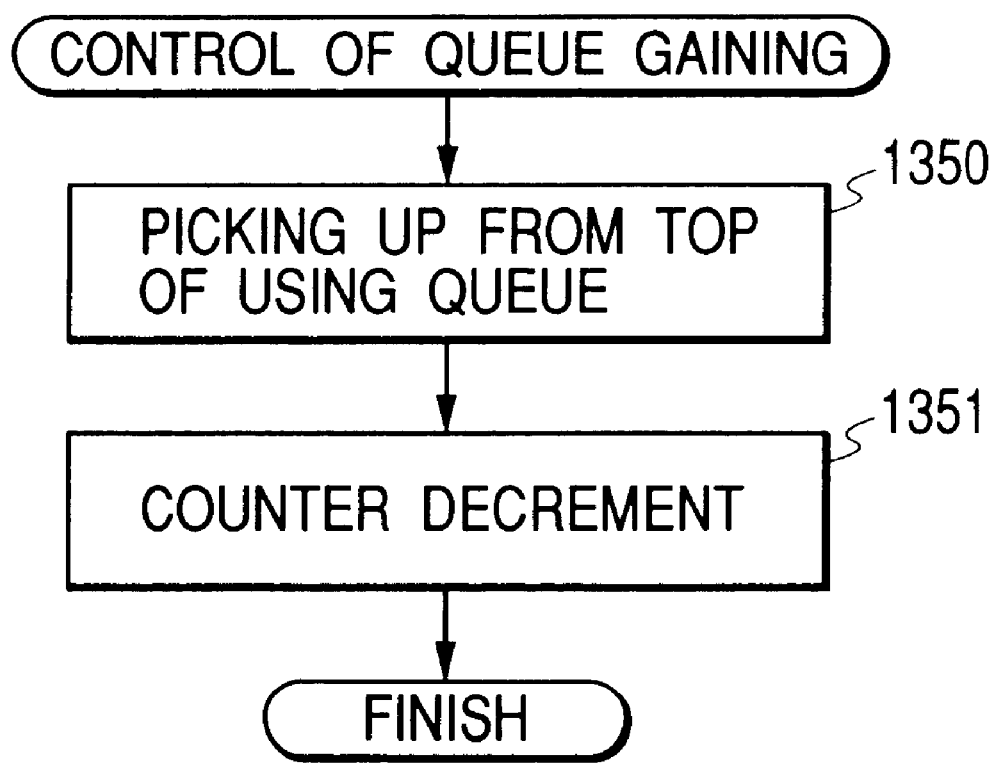
FIG. 15 illustrates an in-use queue gaining (depriving) control in the embodiment 1 of the present invention.

FIG. 14 and FIG. 15 illustrate the configuration of the cache queues and the processing flow of the queue depriving control at the step 803. The cache queues are queues for managing the used/unused situation of the cache area parts 108. As illustrated in FIG. 14, the cache queue includes two queues, i.e., an in-use (using) cache queue 1401 and an unused cache queue 1410. The in-use cache queue 1401 is a queue for managing the cache area where data is stored. The unused cache queue 1410 is a queue for managing the empty area where no data is stored. The in-use cache queue 1401 includes a forward pointer 1402, a backward pointer 1403, a volume name 1404, a volume area number 1405, a cache address 1406 where data is stored, and an unwritten bit 1407. The structure of 1402~1407 is the management unit of the cache. In one structure, the capacity of about 64 K bytes is managed. The forward pointer 1402 and the backward pointer 1403, which are pointers for connecting the respective cache queues, are modified at the time when there occurs the deprivation or the registration of the queues. The volume name 1404 and the volume area number 1405 store a volume name of data stored on a cache area 108 and an area number in the volume. The unit of the area is the same as the cache management unit in size. The cache address 1406 and the unwritten bit 1407 are an address of the cache area 108 on which the data with the volume name 1404 and the volume area number 1405 is stored. The unwritten bit 1407 is on in a state where the newest data has not yet written into the volume, and is off in a state where the newest data is written into the volume. Queue indexes 1417 are indexes provided for speeding up the determination of the depriving priority order of the cache areas. The step 803 in FIG. 9 is a step that becomes one of the features of the present invention. At this step, in order to obtain and deprive the cache area having the highest depriving priority order, i.e., the cache area having the lowest access frequency or the wide range of I/O working set, it is required to retrieve the in-use cache queue 1401. However, when the cache areas 108 having the total capacity of, for example, 1 GB are managed in the 64 K-byte unit, it is required to retrieve 10000 or more queues. This necessitates a too large overhead, and accordingly, the queue indexes 1417 are provided so as to speed up the retrieval. The queue index 1417 includes an index value 1408 and a counter 1409. The counter 1409 is a counter for indicating how many queues are registered within the range of the index value. This information is used as information for performing the switching between the cache controlling method according to the access characteristic in the present invention and the cache managing method in the conventional LRU method. This will be described later in an in-use cache queue registration processing. Although it is possible to set an arbitrary numerical value as the index value 1408, there is stored therein a value for perform the partition in the order from the lowest of the access frequencies 903 in the access character table in FIG. 10. At the time of the queue registration, referring to the access frequencies 903 in the access character table in FIG. 10, the registration into the queues is performed so that the access frequencies fall in the range of the index value 1408. The areas are not completely arranged in the order of the access frequencies 903 within the range of the index value, but are arranged in the order within the range unit of the index value. Also, a significant meaning lies in both of the extreme cases of queues where the areas having the higher access frequencies 903 are left and where the areas having the lower access frequencies 903 are deprived. Consequently, the arrangements need not be complete in the intermediate queues and within the range of the index value. Thanks to the existence of the queue indexes 1401, just by performing the scannings by the number of the indexes, i.e., for example, 10, it becomes possible to arrange the queues in the order of the access frequencies at the time of the queue registration. Namely, the queues on the left side include the areas having the higher depriving priority order and the queues on the right side include the areas having the lower depriving priority order. In this way, at the time of the queue registration, sorting the queues in the order of the depriving priority order makes the following possible: As illustrated in the processing flow of the queue depriving control in FIG. 14, the areas having the lower access frequency or the wider range of I/O working set are deprived and reused by the execution of only the following two steps: A step 1350 at which the deprivation is performed from the top portion of the queue having the lowest queue depriving priority order, and a step 1351 at which the number of the deprived queues within the range of the index range value is decremented. The unused cache queue 1410 is the queue for managing the empty area where no effective data is stored. The unused cache queue 1410 includes a forward pointer 141 1, a backward pointer 1412, a volume name 1413, a volume area number 1414, a cache address 1415 where data is stored, and an unwritten bit 1416. As is the case with the in-use cache queue 1401, the structure of 1411–1416 is the management unit of the cache and the capacity of, for example, about 64 K bytes is managed in one structure. The forward pointer 1402 and the backward pointer 1403, which are pointers for connecting the respective cache queues, are modified at the time when there occurs the deprivation or the registration of the queues. Effective data has not yet stored in the respective fields of the volume name 1413, the volume area number 1414, the cache address 1415 where data is stored, and the unwritten bit 1416. Accordingly, the values of the fields have not been determined yet, and the effective information is stored into the fields when the registration into the queue is performed.

Figure 16:
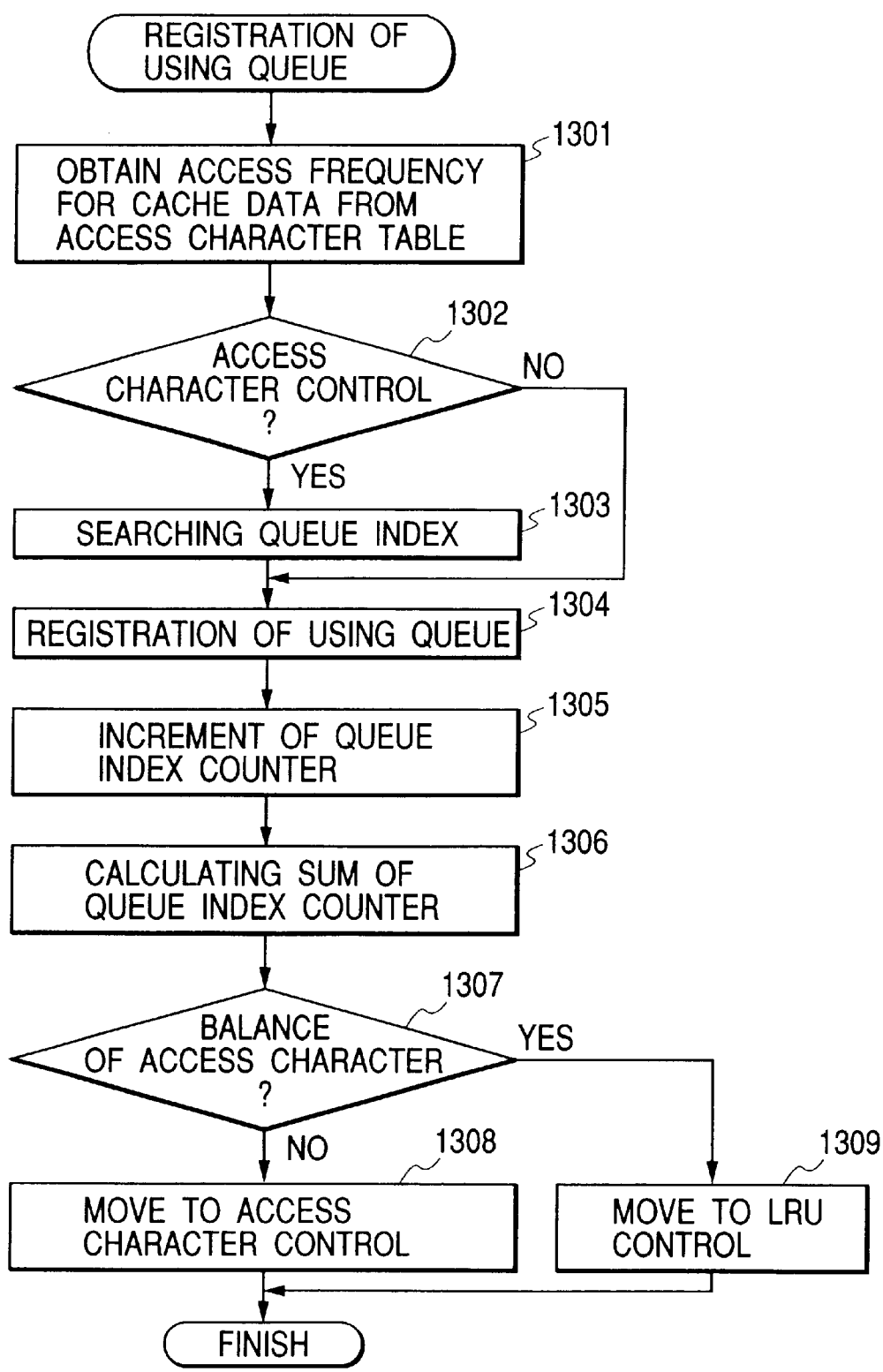
FIG. 16 illustrates an in-use queue registering flow in the embodiment 1 of the present invention.

FIG. 16 illustrates the flow of the in-use cache queue registration described above. At a step 1301, the access frequency is obtained of the data to be registered into the in-use cache queues from the access character table. At a step 1302, it is judged whether the present cache controlling mode is the access characteristic control in the present invention or the LRU control. This is intended to make it possible to switch to a method that is efficient in view of the present access state. If the mode is the access characteristic controlling mode, proceed to a step 1303. Otherwise, proceed to a step 1304. At the step 1303, the searching of the queue indexes is performed. In this searching, as described earlier, based on the access frequency obtained from the access character table at the step 1301, the retrieval is performed about into which position of the in-use cache queues the data should be registered. Through this retrieval, the data having the higher access frequency or the narrower range of I/O working set is registered into a position where the data is difficult to deprive. Conversely, the data having the lower access frequency or the wider range of I/O working set is registered into a position where the data is easy to deprive. At the step 1304, the registration is performed into the specified queue position. In the case of the LRU control, the connection to the top of the queue is always performed. This, namely, means that, in the case of the LRU, the position closer to the top of the queue has the higher access frequency. At a step 1305, the counter 1409 of the queue index thus registered is incremented. At a step 1306, a summation is calculated of the counter 1409 portions of the queue indexes 1407. This numerical value calculated is used at a step 1307. At the step 1307, it is judged whether or not the access characteristics are equalized. In this judgment, a ratio between the result at the step 1305 and the result at the step 1306 is calculated, then determining, out of the entire in-use queue, what percentage of the queue exists in the range of the index value 1408. If the percentage is larger than a predetermined percentage, it means that the accesses are equalized. At this time, the control is transferred to the conventional LRU control (1309). This is because, when the access characteristics are equalized, the conventional LRU control need not execute the step 1303 and, by the amount, is able to perform a higher-speed cache queue management. This is further due to the fact that the cache controlling method in the present invention exhibits a greater effect if a variation occurs in the access characteristics, and exhibits a lesser effect when the access characteristics are equalized. In the LRU control mode as well, the update of the queue indexes is performed. This condition, if the variation comes to occur in the accesses, makes it possible to switch at the step 1307 the control to the access characteristic control in the present invention (1308).

Figure 17:
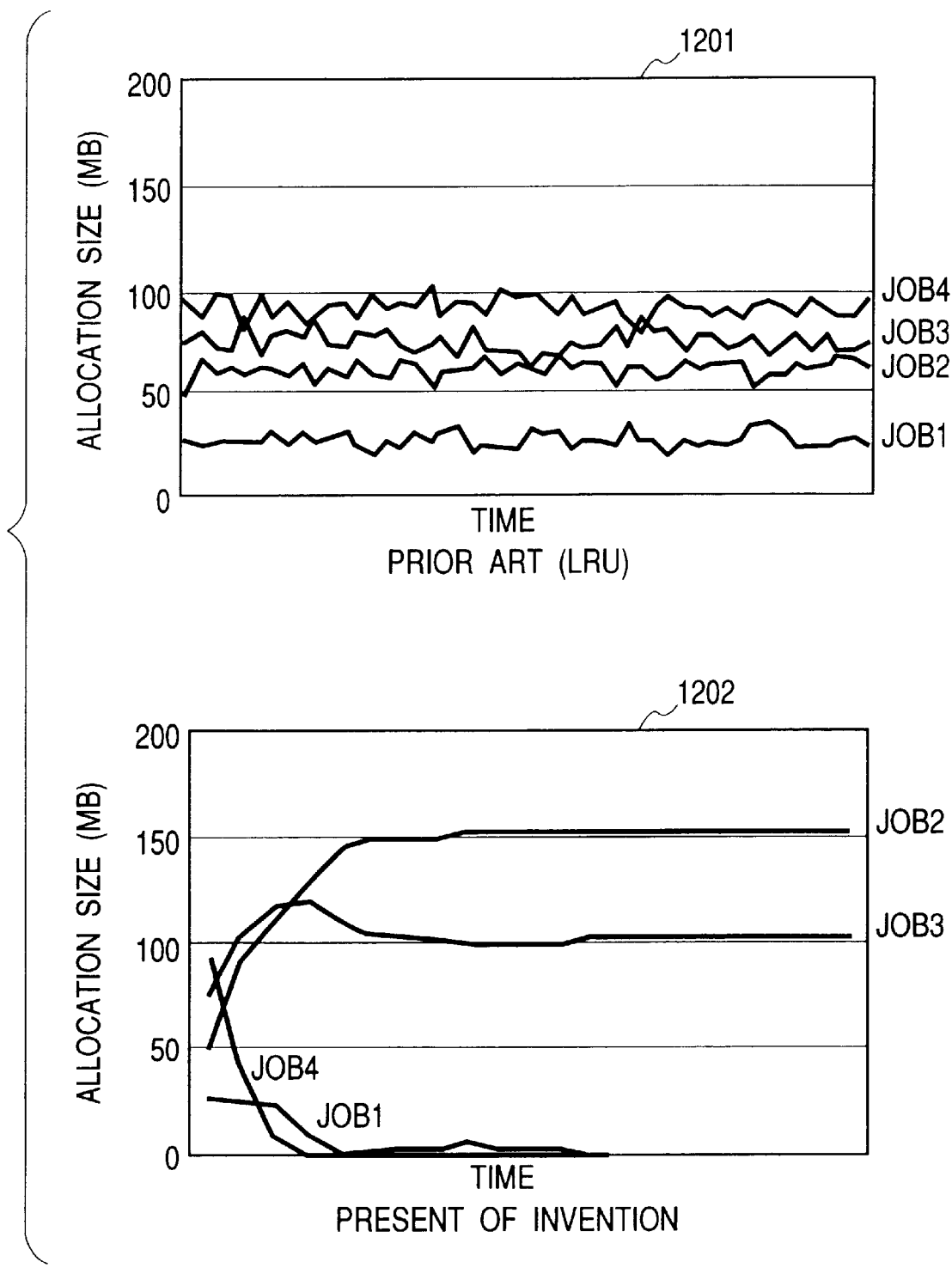
FIG. 17 illustrates effects in the embodiment 1 of the present invention.

FIG. 17 illustrates an example in which, in an environment where a plurality of applications (JOBs) operate simultaneously, the capacities of the cache areas 108 allocated to the respective applications are compared with each other in the cache controlling method in the present invention and in the conventional LRJ method. The access characteristics of the respective JOBs are descendent in the order of JOB4, JOB3, JOB2, and JOB1. Also, the I/O working sets are ascendant in the order of JOB 2, JOB 3, JOB 1, and JOB 4. A reference numeral 1201 denotes the diagram in the conventional LRU method. In the conventional method according to the LRU, since only the access frequencies are considered, more of the cache areas are allocated in the descendent order of the access frequencies. In the present example, most of the cache areas are allocated to the JOB 4 because it has the highest access frequency. The JOB 4, however, has the wide range of I/O working set. Accordingly, the high cache hit rate cannot be expected even if the large cache areas are allocated thereto, thus resulting in an inefficient allocation of the cache areas 108. In contrast to this, in the cache controlling method according to the present invention, the control is performed so that more of the cache area parts 108 are allocated to the areas having the narrow range of I/O working set and the high access frequency as is illustrated in the diagram 1202. Namely, because the JOB 4 has the high access frequency but has the wide range of I/O working set, the high hit rate cannot be expected even if the wide cache area 108 is allocated thereto. Consequently, unlike the case of the LRU method, the control is performed that makes it easy to deprive the area allocated in the cache area 108. The deprived areas are allocated to the JOB 2 and the JOB 3 having the comparatively high access frequency and the narrow range of I/O working set, thereby making it possible to enhance the cache hit rate of the entire disk array controller. Also, it is possible to obtain the high cache hit rate even in the case of the small cache capacity. Since the cache controlling method according to the present invention is accompanied by the searching of the queue, the processing time becomes longer as compared with the conventional cache controlling method such as the LRU. Although the cache is a speeding-up method used in the field of the processor as well, the cache provided inside the processor is requested to have the high-speed performance. This condition makes it rather difficult to employ the cache controlling method accompanied by the searching such as the present invention. However, the object of the disk cache is to speed up the disk access, and the speed obtained from the disk cache is fast enough to speed up the disk accompanied by the mechanical movements in the processing.

Figure 18:
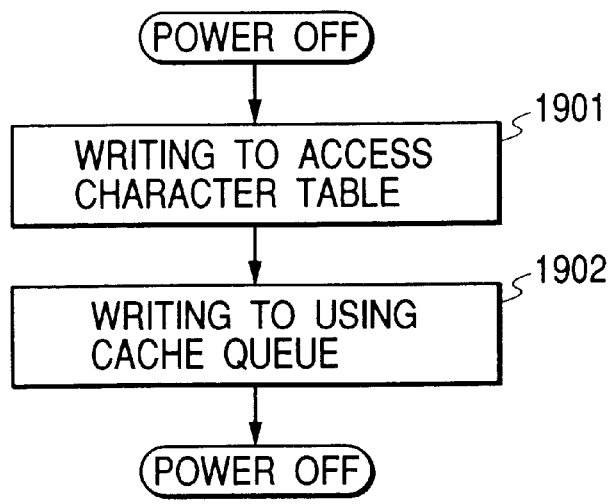
FIG. 18 illustrates a flow at the time of power-off in the embodiment 1 of the present invention.
Figure 19:
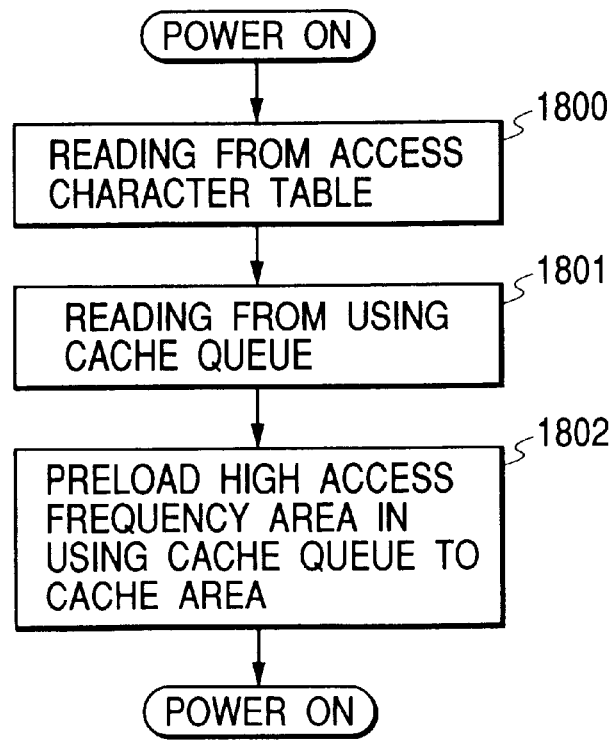
FIG. 19 illustrates a flow at the time of power-on in the embodiment 1 of the present invention.

FIG. 18 and FIG. 19 illustrate flows a method of using the access character table at the times of power-off and power-on of the disk array controller 122. At a step 1900 in FIG. 18, the access character table (FIG. 10) is written into unused areas of the drives (117–121). At a step 1902, the in-use cache queues are written into the unused areas of the drives (117–121). The access character table (FIG. 10) and the in-use cache queues written into the unused areas of the drives (117–121) are used at the time of the power-on illustrated in FIG. 19. FIG. 19 illustrates the flow by which, before the host 101 starts the access and from the access character table (FIG. 10) and the in-use cache queues written at the time of the power-off, the data of the volumes are loaded in advance within the cache area 108 at the time of the power-on. At a step 1800, the access character table (FIG. 10) is read that has been written at the step 1900 in FIG. 18. At a step 1801, the in-use cache queues are read that have been written at the step 1902 in FIG. 18. At a step 1802, an area that has the highest access frequency is retrieved out of the in-use cache queues, then inputting the data thereon into the cache area 108 in the highest precedence. Also, the access character table (FIG. 10) stores the information before turning off the power, and accordingly can be controlled in correspondence with the access characteristic from immediately after turning on the power. Thus, the controls in FIG. 18 and FIG. 19 allow the high performance to be exhibited from immediately after the power-on. Also, although FIG. 18 and FIG. 19 illustrate and describe the controls at the times of the power-off and the power-on, the precedence inputting at the step 1802 can also be executed in an idle state where the control processor 104 of the disk array controller 122 executes no processing. Namely, inputting the data in the highest precedence before the host 101 makes the access allows the cache hit rate to be enhanced even during the operation. Also, the access character table (FIG. 10) alone allows the precedence inputting to be performed. This is made possible by searching the access character table and reading-in the area having the highest access frequency into the cache area 108 with the highest priority.

Embodiment 2

Figure 20:
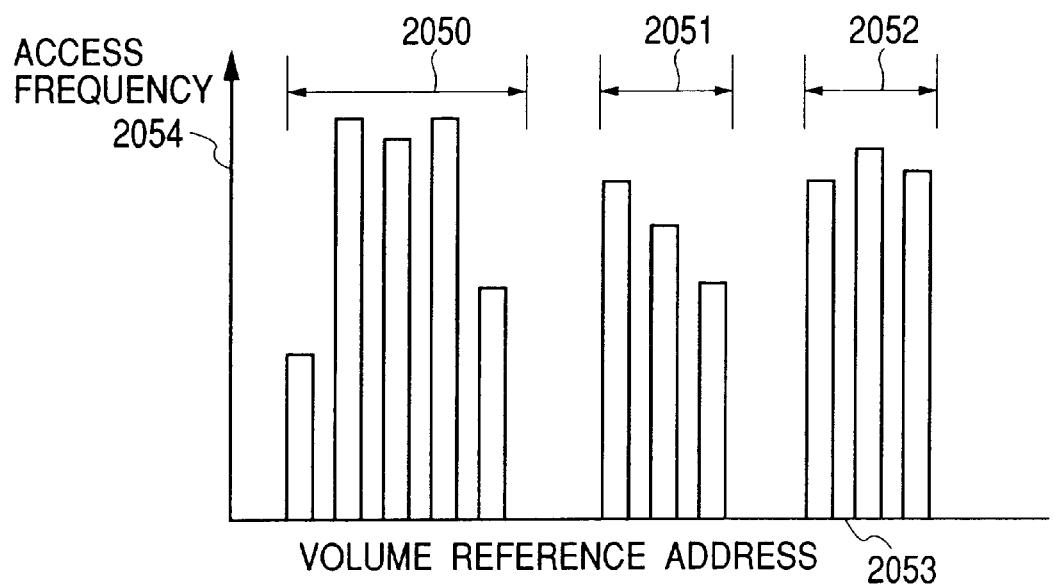
FIG. 20 illustrates a volume where a plurality of I/O working sets exist in an embodiment 2 of the present invention.
Figure 21:
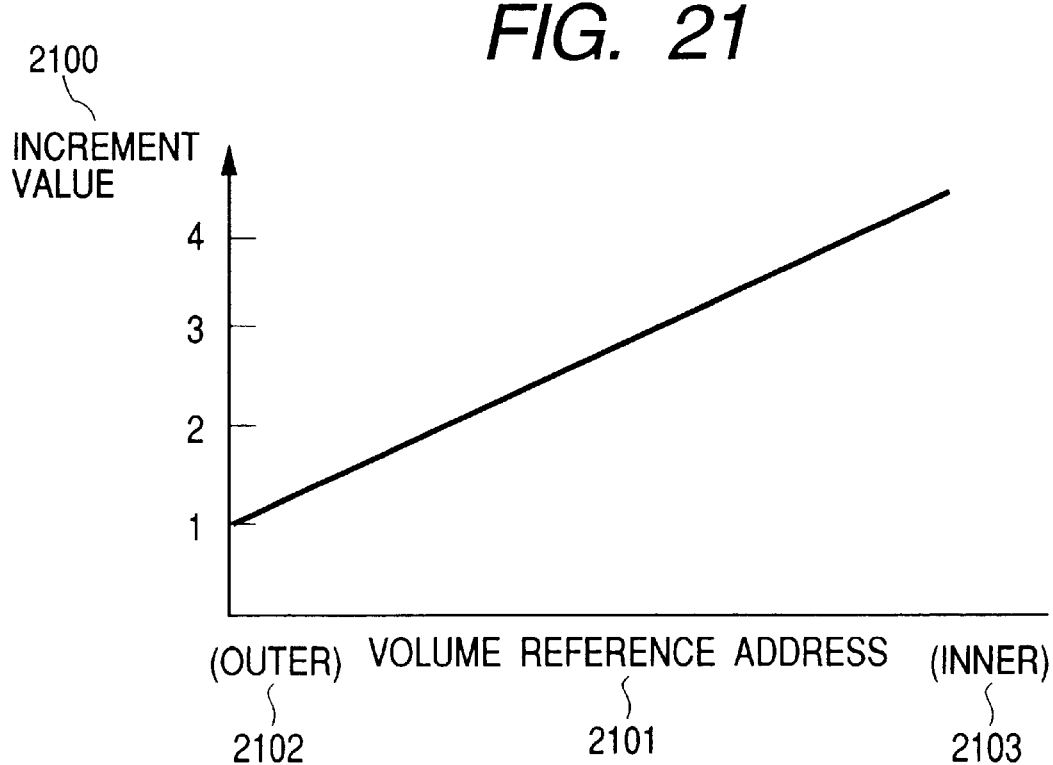
FIG. 21 illustrates the relationship between a volume address and an increment value in the embodiment 2 of the present invention.

Hereinafter, illustrating the drawings, the explanation will be given concerning an embodiment 2 of the disk cache controlling method related to the present invention. In the embodiment 1, the description has been given concerning the method where the areas having the narrower range of I/O working set are left within the cache with the higher priority. In the embodiment 2, the description will be given regarding a disk cache controlling method where the characteristics of the access time of the drive are taken into consideration. The drive includes a plurality of disks, and a reading and a writing of data are performed by heads provided on the surface and the back surface of each disk. The reading and the writing of data are implemented by the following operations: A seeking operation of moving a head to a target place, a searching operation of waiting for the target place of the rotating disk to come, and the reading and writing operations of data toward the target place. Among these operations, the seeking operation is accompanied by the movement of moving the head, and accordingly is the slowest of all. Also, the seeking operation has a characteristic that it takes more time as the movement distance of the head is increased. In the embodiment 2, there is described a disk cache controlling method of shortening this seeking time of the drive. FIG. 20 illustrates an example where a plurality of I/O working sets exist in a single volume. A reference numeral 2053 denotes a volume reference address and a numeral 2054 denotes the access frequency. The I/O working sets are denoted by numerals 2050, 2051, and 2052. In this example, the accesses are made all over the areas of the volume. Namely, this example is a case where it can be anticipated that a long distance movement of the head occurs a lot. In the present embodiment, in order to make the head movement distance as short as possible, the control is performed in such a manner that the working set at the end of the volume address is subjected to the caching with the highest priority. For this purpose, the increment value at the step 1305 in FIG. 16, which determines the priority order of the areas left within the cache area, is changed in correspondence with the address of the volume accessed. FIG. 21 illustrates the relationship between the volume address and the increment value. A reference numeral 2101 denotes the volume reference address and a numeral 2100 denotes the increment value. The increment value is set in such a manner that the increment value is decreased as the head becomes closer to the outer side (2102) of the drive and the increment value is increased as the head becomes closer to the inner side (2103). This setting, seemingly, can make the areas closer to the inner side 2103 seem to have the higher access frequency. As a result, the areas become more likely to remain within the cache areas. Also, as is described in detail in the embodiment 1, the control is also performed simultaneously where the areas having the higher access frequency and the narrower range of I/O working set are left with the higher priority. By the amount that the data at the inner side of the drive becomes more likely to be stored into the cache areas, the data at the outer side becomes less likely to be stored. However, the performance can be enhanced by the effect of shortening the head movement distance and by an effect that the reading/writing performance is superior at the outer side. This control makes it possible to perform the cache control of taking into consideration the access characteristic and the performance characteristic of the drive, thereby allowing the performance to be enhanced even further.

Embodiment 3

Hereinafter, illustrating the drawings, the explanation will be given concerning an embodiment 3 of the disk cache controlling method related to the present invention. In the embodiment 1, the explanation has been given concerning the method where the access characteristics are detected by the disk array controller 122 without modifying an application operating on the host 101. In the present embodiment, the explanation will be given regarding a disk cache controlling method where, in order to detect the access characteristics more precisely, an area or a characteristic to be accessed on the part of the application is specified.

Figure 22:
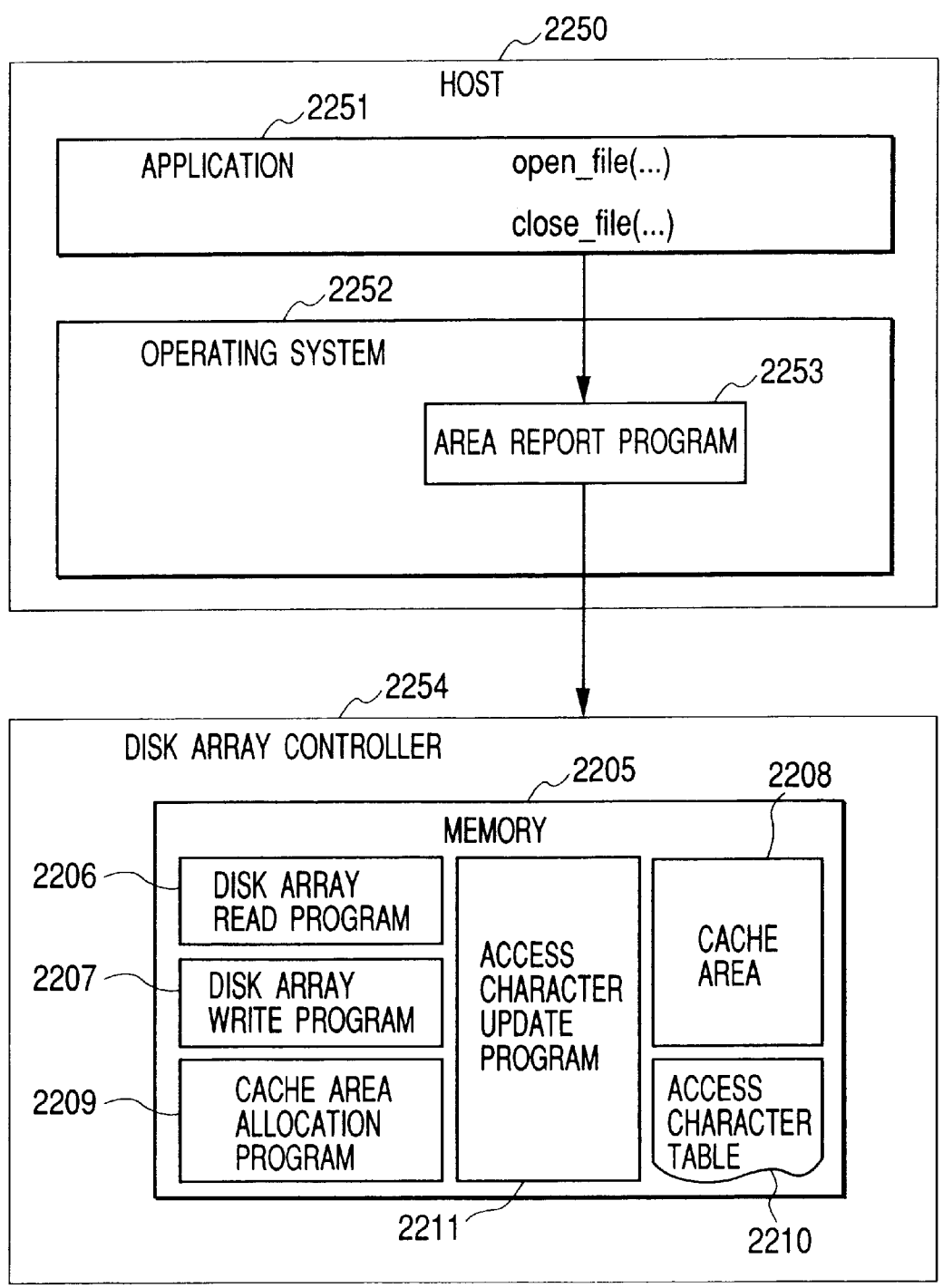
FIG. 22 illustrates the entire configuration diagram in an embodiment 3 of the present invention.

FIG. 22 illustrates the configuration of programs on a host 2250 in the embodiment 3 of the present invention, and the configuration inside a memory 2208 within a disk array controller 2254. In order to specify, to the disk array controller 2254, an area or a characteristic to which an application 2251 makes an access, there is newly provided an area report program 2253 within an operating system. The area report program 2253 performs a processing of notifying the disk array controller 2254 of input parameters of an open_file and a close_file that the application issues when it starts using and finishes using files. Inside a memory 2205 within the disk array controller 2254, a disk array read program 2206 is a control program for controlling an input request issued from the host 2250, and a disk array write program 2207 is a control program for controlling an output request issued from the host 2250. A cache area allocation program 2209 performs allocation of cache area 2208 for storing data. An access character table 2210 stores information on characteristics of the input/output issued from the host 2250. An access character table update program updates the access character table 2210 in accordance with a command issued from the area report program 1153.

Figure 23:
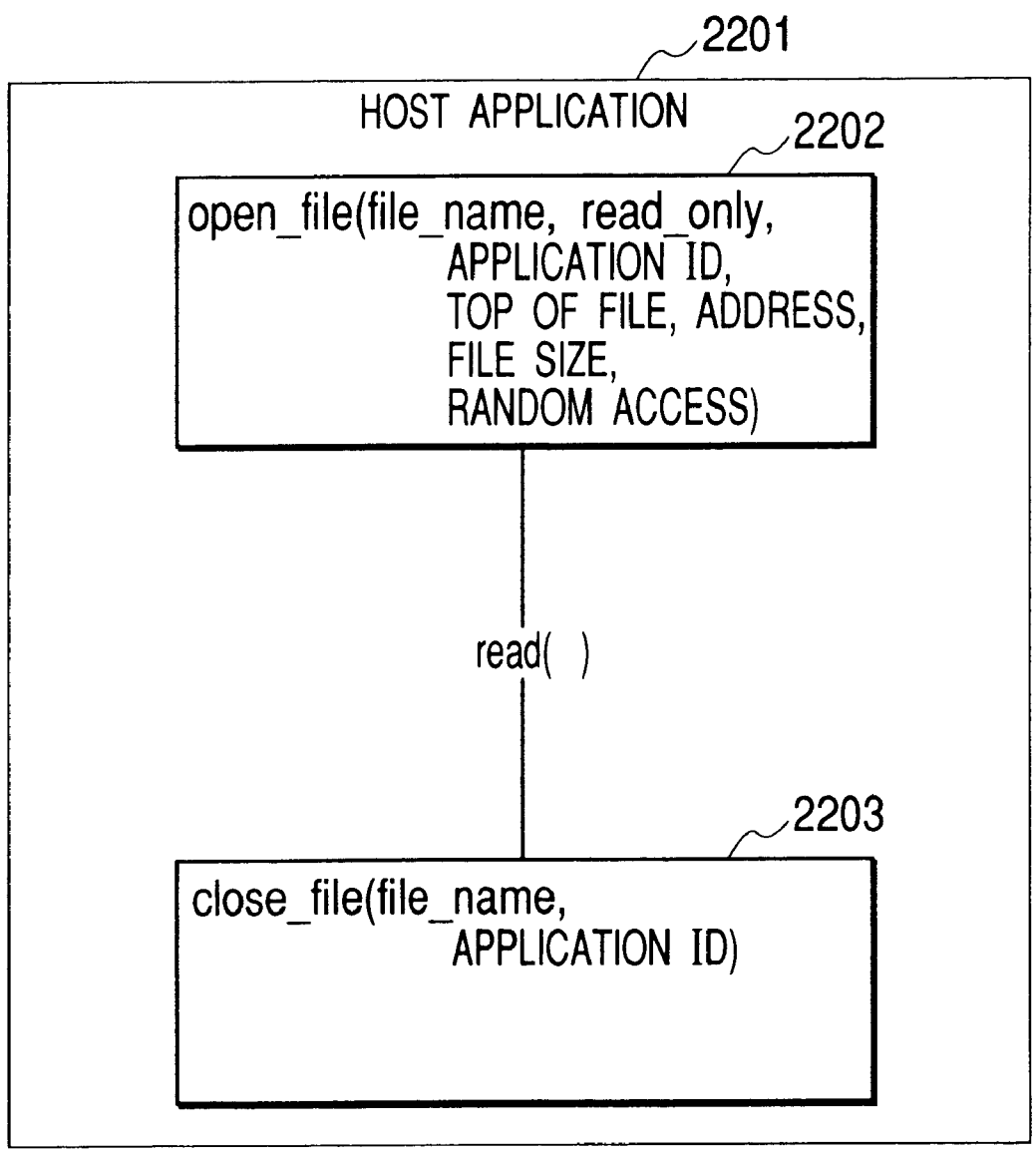
FIG. 23 illustrates the configuration of an application in the embodiment 3 of the present invention.

FIG. 23 illustrates and explains file operations of the application running on the host. A numeral 2202 denotes the parameters of the open_file that the application issues when it starts using the files. The input parameters of the open_file are file name, application identifier, file head address, file sizes, and access characteristic. Out of these parameters, the application identifier, the file head address, the file size, the access characteristic, and an open command are transferred as information to the disk array controller. The application identifier is identifier that make it possible to identify the application uniquely toward the disk array controller. The access characteristic is information for indicating whether the application is random or sequential toward the file. Other than the random and the sequential accesses, it is possible to specify complicated accesses, such as an access skipping at a fixed width, an access making a reference, or an order. Also, a numeral 2203 denotes the parameters of the close_file that the application issues when it finishes using the files. The input parameters of the close_file are the file name and the application identifier. In the case of the close_file, a close command and the application identifier is transferred to the disk array controller.

Receiving the access characteristics 2202, 2203 of the application transferred through the area report program 2253, the access character table update program 2211 updates an access character table as illustrated in FIG. 24. A numeral 2401 denotes application identifiers transferred from the host 2250, and a numeral 2402 denotes access characteristics transferred from the host 2250. Numerals 2403, 2404, and 2405 are the same as the numerals 901, 902, and 903 illustrated in FIG. 10. Incidentally, the volumes 2403 and the area numbers 2404 are transformed from the file head addresses and the file sizes.

The method of controlling the cache other than the 10 above-described features is the same as that of the embodiment 1. The file areas or the access characteristics are designated from the application. This makes it possible to perform the cache control more precisely as compared with the embodiment 1. Also, the access character table suffices to manage only the areas designated from the host 2250. This permits the capacity to be reduced.

Also, the following control is also possible: The application 2201 transfers, to the disk array controller 2254, the capacity of the cache areas that should be ensured as a minimum requirement degree. Then, the disk array controller 2254 does not deprive any more than the cache capacity transferred at the time of depriving the cache areas This control can be implemented in the following manner: First, a field of a minimum allocation cache capacity and 25 that of the present allocation cache capacity are added for each of the application identifiers 2401 in the access character table. Next, at the time of the registration into the in-use cache queues (FIG. 16) and at the time of the queue deprivation (FIG. 15), the present allocation cache capacity is updated, then being compared with the minimum allocation cache capacity at the time of the queue deprivation (FIG. 15). Finally, if the present allocation cache capacity is found to be lower than the minimum allocation cache capacity, no deprivation is executed and the next deprivation candidate is determined out of the in-use cache queues. This allows the above-described control to be implemented. Also, the minimum allocation cache capacity can also be implemented not by the designation from the application but by registering the capacity within the disk array controller in advance.

As having been described above, according to the present invention, the control is performed so that more of the cache areas are allocated to a volume where the distribution of the access frequency is localized. This makes it possible to enhance the cache hit rate of the entire system.

Incidentally, the present invention is also applicable to the control of a cache memory in a computer including a CPU, a main memory, and the cache memory, and to the control of a cache memory provided within a controller for controlling a plurality of storage systems.

What is claimed is:

1. A disk cache controlling method in a disk array system including a plurality of disk devices and a disk cache, data being divided and stored into said plurality of disk devices, a plurality of volumes being assigned to said disk devices, wherein a disk array controller controls said disk devices, wherein assignment of new disk cache areas to said data is performed by said disk cache controlling method comprising the steps of:

dividing each of said volumes into areas with an arbitrary fixed length;

calculating an access frequency to data in each of the divided areas of each of said volumes;

determining the divided areas having higher access frequencies compared with an average access frequency for each of the volumes based on a distribution of the calculated access frequencies; and changing assignment of said disk cache areas to said divided areas of each of said volumes according to an access characteristic divided areas determined in said determining step, wherein said disk cache areas having stored data the access frequencies to which have been the lowest are reassigned to said divided areas.

2. The disk cache controlling method as claimed in claim 1, further comprising a step of:

switching said assignment of said disk cache areas to LRU (least recently used) control in correspondence with said access frequency to data in each of the divided areas of each of said volumes.

3. The disk cache controlling method as claimed in claim 2, further comprising the steps of:

checking variation in said access frequency to data in each of the divided areas of each of said volumes, and switching said assignment of said disk cache areas to said LRU control if said variation is found to be small.

4. The disk cache controlling method as claimed in claim 1, further comprising a step of:

setting a product of a number of accesses and a weight of said access frequency, said weight being larger as said area accessed separates farther away from an initial position of a head of said each disk device.

5. The disk cache controlling method as claimed in claim 1, further comprising a step of:

setting a,product of a number of accesses and a weight of said access frequency, said weight being larger as said area accessed approaches nearer to an inner side of a drive of said each disk device.

6. The disk cache controlling method as claimed in claim 1, further comprising the steps of:

saving information on said access frequencies into an unused area of said disk device at the time of power-off; and reading-out, after said disk array controller is powered on, said information on said access frequencies stored in said disk device; and reading-in, out of said information on said access frequency for each of the divided areas of said volume, an area the access frequency of which is the highest into said disk cache in the highest precedence.

7. The disk cache controlling method as claimed in claim 1, further comprising the steps of:

providing an area including two planes into which information on said access frequency to data in each of the divided areas of said volume is to be stored;

using first access frequency information stored in a first plane for controlling said disk cache;

using second access frequency information stored in a second plane for sampling said access frequencies; and switching said first and said second access frequency information to each other every time a fixed length of time has been elapsed.

8. A disk cache controlling method in a disk array system including a plurality of disk devices and a disk cache, data being divided and stored into said plurality of disk devices, a plurality of volumes being assigned to said disk devices, wherein each of said volumes is divided in to a plurality of areas each having an arbitrary fixed length, wherein a host connected to said disk array system transfers a command including an application identifier, and said disk array system acquires an access frequency to data in each of said divided areas indicated by said application identifier, said disk cache controlling method comprising a step of:

determining whether the access frequencies of the divided areas indicated by said application identifier are higher than an average access frequency of whole areas;

depriving, at the time of assignment of new disk cache areas to the divided areas of each of the volumes, said disk cache areas of use of said divided areas according to a result of the determining step, wherein a disk cache area having stored data the access frequency to which is the lowest is deprived and reassigned to a divided area having the lowest access frequency.

9. The disk cache controlling method as claimed in claim 8, wherein said host adds assignment quantity of said disk cache to said transferred command, and, at the time of depriving said disk cache areas, said disk array system leaves said assignment quantity of said disk cache added to said transferred command.

10. A disk array system comprising:

a plurality of disk devices;

a disk cache; and a disk array controller connectable to said plurality of disk devices and said disk cache, wherein data are divided and stored into said plurality of disk devices, a plurality of volumes are assigned to said disk devices, wherein a disk array controller divides each of said volumes into areas with an arbitrary fixed length, calculates an access frequency to data in each of the divided areas, determines the divided areas having higher access frequencies than an average access frequency for each of the volumes based on a distribution of the calculated access frequencies of each of the volumes, and changes assignment of new disk cache areas to said divided areas of each of said volumes according to an access characteristic of the determined areas, wherein said disk cache areas having stored data the access frequencies to which have been the lowest are reassigned to said divided areas.

11. The disk array system as claimed in claim 10, further comprising means for switching said assignment of said disk cache areas to LRU (least recently used) control in correspondence with said access frequency to data in each of the divided areas of said volume.

12. The disk array system as claimed in claim 11, further comprising:

means for checking variation in said access frequency to data in each of the divided areas of each of said volumes, and means for switching said assignment of said disk cache areas to said LRU control if said variation is found to be small.

13. The disk array system as claimed in claim 10, further comprising:

means for setting a product of a number of accesses and a weight of said access frequency, said weight being larger as said area accessed approaches nearer to an inner side of a drive of said each disk device.

14. The disk array system as claimed in claim 10, further comprising:

means for saving information on said access frequency to data in each of the divided areas of each of said volumes into an unused area of said disk device at the time of power-off; and means for reading-out, after said disk array controller is powered on, said information on said access frequency to data in each of the divided areas of each of said volumes stored in said disk device, and reading-in, out of said information on said access frequency to data in each of the divided areas of each of said volumes, an area the access frequency of which is the highest into said disk cache in the highest precedence.

15. The disk array system as claimed in claim 10, further comprising:

an area for storing information on said access frequency to data in each of the divided areas of each of said volumes, and means for switching first access frequency information and second access frequency information to each other every time a fixed length of time has been elapsed, said first access frequency information being stored in a first area of said area and being used for controlling said disk cache, said second access frequency information being stored in a second area of said area and being used for sampling said access frequency for each of the divided areas of each of said volumes.

16. A system, comprising:

a disk array system including a plurality of disk devices and a disk cache, data being divided and stored into said plurality of disk devices, a plurality of volumes being assigned to said plurality of disk devices, wherein each of said volumes is divided into a plurality of divided areas each having an arbitrary fixed length, and a host, being connected to said disk array system, transfers a command including an application identifier, wherein said disk array system acquires an access frequency to data in each of said divided areas indicated by said application identifier, and said disk array system further comprising:

means for determining whether the access frequencies of the divided areas indicated by said application identifier are higher than the average access frequency of whole areas;

means for controlling said disk cache so that, at the time of assignment of disk cache areas to the divided areas of each of the volumes, said disk cache areas are deprived according to a result of the determining means, wherein a disk cache area having stored data to which access frequency is the lowest is deprived and reassigned to the divided area.

17. The disk array system as claimed in claim 16, wherein said host includes means for adding an assignment quantity of said disk cache to said transferred command, and wherein said disk cache controlling means includes means for performing a control of leaving, at the time of depriving said disk cache areas, said assignment quantity of said disk cache added to said transferred command.

18. A disk cache controlling method in a storage system including a disk device in which data is stored and a disk cache, wherein assignment of new disk cache areas to said data is performed by the steps of:

segmenting said disk device into areas each having an arbitrary fixed length;

calculating an access frequency to data in each segmented area of said disk device;

determining the areas having higher access frequencies compared with an average access frequency for the disk device based on a distribution of the calculated access frequencies; and assigning said disk cache areas to said segmented areas according to a result of the determining step, wherein said disk cache areas having stored data the access frequencies to which have been the lowest are reassigned to said segmented areas.

19. A disk cache controlling method in a storage system including a disk device in which data is stored and a disk cache, wherein assignment of new disk cache areas to said data is performed by the steps of:

segmenting said disk device into areas each having an arbitrary fixed length;

calculating an access frequency to data in each segmented area of said disk device a product of a number of accesses and a weight being set to said access frequency, said weight being larger as said area accessed separates further away from an initial position of a head of said disk device;

determining the segmented areas having higher access frequencies compared with an average frequency for said disk device based on a distribution of the calculated access frequencies; and assigning said disk cache areas to said segmented areas according to a result of the determining step, wherein said disk cache areas having stored data the access frequencies to which have been the lowest are reassigned to said segmented areas.

20. A disk cache controlling method in a storage system including a disk device in which data is stored and a disk cache, wherein assignment of new disk cache areas to said data is performed by the steps of:

segmenting said disk device into areas each having an arbitrary fixed length;

calculating an access frequency to data in each segmented area of said disk device, a product of a number of accesses and a weight being set to said access frequency, said weight being larger as said area accessed approaches nearer to an inner side of a drive of said disk device;

determining the segmented areas having higher access frequencies compared with an average access frequency for said disk device based on a distribution of the calculated access frequencies; and assigning said disk cache areas to said segmented areas according to a result of the determining step, wherein said disk cache areas having stored data the access frequencies to which are the lowest are reassigned to said segmented areas.

21. A storage system including a disk device in which data is stored and a disk cache, comprising:

means for segmenting said disk device into areas each having an arbitrary fixed length;

means for calculating an access frequency to data in each segmented area of said disk device;

means for determining the segmented areas having higher access frequencies compared with an average access frequency for said disk device based on a distribution of the calculated access frequencies; and means for controlling said disk cache so that assignment of new disk cache areas to said segmented areas according to a result in the determining step, wherein said disk cache areas having stored data the access frequencies to which are the lowest are reassigned to said segmented areas.

22. A storage system including a disk device in which data is stored and a disk cache, comprising:

means for segmenting said disk device into areas each having an arbitrary fixed length;

means for calculating an access frequency to data in each segmented area of said disk device;

means for determining the segmented areas having higher access frequencies compared with an average access frequency for the disk device based on a distribution of the calculated access frequencies; and means for controlling disk cache assignment of new disk cache areas to said segmented areas according to a result in the determining means, wherein said disk cache areas having stored data to which access frequencies are the lowest are reassigned to said segmented areas; and means for setting a product of a number of accesses and a weight of said access frequency, said weight being larger as said area accessed separates farther away from an initial position of a head of said disk device, wherein a disk cache area assigned to said segmented area is made less likely to be deprived.

23. A storage system including a disk device in which data is stored and a disk cache, comprising:

means for segmenting said disk device into areas each having an arbitrary fixed length;

means for calculating an access frequency to data in each segmented area of said disk device;

means for determining the segmented areas having higher access frequencies compared with an average access frequency for said disk device based on a distribution of the calculated access frequencies;

means for controlling disk cache assignment of new disk cache areas to said segmented areas according to a result in the determining means, wherein said disk cache areas having stored data the access frequencies to which have been the lowest are reassigned to said segmented areas; and means for setting a product of a number of accesses and a weight of said access frequency, said weight being larger as said area accessed approaches nearer to an inner side of a drive of said disk device, wherein a disk cache area assigned to said segmented area is made less likely to be deprived.

24. A disk cache controlling method in a disk array system including a plurality of disk devices in which data is stored and a disk cache, a plurality of volumes being assigned to said plurality of disk devices, wherein a disk array controller controls said disk devices, wherein assignment of disk cache areas is performed by said disk cache controlling method comprising the steps of:

dividing each of said volumes into areas with an arbitrary fixed length;

specifying a plurality of I/O working sets based on distribution of access frequencies of respective divided areas;

comparing widths of the I/O working sets corresponding to the divided areas within each volume of said plurality of volumes; and assigning said disk cache areas to a narrower I/O working set with a higher priority.

25. The disk cache controlling method as claimed in claim 24, wherein said comparing step comprises the step of:
- determining an access frequency to data in each of said areas; and
- checking variation in said access frequency to data in each of the divided areas of said volume.

26. The disk cache controlling method as claimed in claim 25, further comprising a step of:
- switching said assignment of said disk cache areas to LRU (least recently used) control in correspondence with said access frequency to data in each of the divided areas of each of said volumes.

27. The disk cache controlling method as claimed in claim 26, further comprising the steps of:
- checking said variation in said access frequency to data in each of the divided areas of said volume, and
- switching said assignment of said disk cache areas to said LRU control if said variation is found to be small.

28. A disk cache controlling method in a disk array system including a plurality of disk devices in which data is stored and a disk cache, a plurality of volumes being assigned to said disk devices, wherein a disk array controller controls said disk devices, wherein assignment of disk cache areas is performed by said disk cache controlling method comprising the steps of:
- dividing each of said volumes into areas with an arbitrary fixed length;
- specifying a plurality of reference areas based on distributions of access frequencies of respective divided areas;
- comparing widths of the reference areas corresponding to the divided areas within each of said volumes, said reference areas being referred to by each application of a plurality of applications on a host; and
- assigning, with the highest priority, said disk cache areas to an application the reference area of which is the narrowest.

29. The disk cache controlling method as claimed in claim 28, wherein said comparing step comprises the steps of:
- determining an access frequency to data in each of said divided areas; and
- checking variation in said access frequency to data in each of the divided areas of each of said volumes.

30. The disk cache controlling method as claimed in claim 29, further comprising a step of:
- switching said assignment of said disk cache areas to LRU (least recently used) control in correspondence with said access frequency to data in each of the divided areas of each of said volumes.

31. The disk cache controlling method as claimed in claim 30, further comprising the steps of:
- checking said variation in said access frequency to data in each of the divided areas of each of said volumes; and
- switching said assignment of said disk cache areas to said LRU control if said variation is found to be small.

32. A disk cache controlling method in a disk array system including a plurality of disk devices in which data is stored and a disk cache, wherein assignment of disk cache areas is performed by the steps of:
- segmenting each of said disk devices into areas with an arbitrary fixed length;
- specifying a plurality of I/O working sets based on distribution of access frequencies of respective segmented areas;
- comparing widths of the I/O working sets, corresponding to the segmented areas, assigned to each job of a plurality of jobs; and
- assigning, with the highest priority, said disk cache areas to a job the I/O working set of which is the narrowest.

33. The disk cache controlling method as claimed in claim 32, wherein said comparing step comprises the steps of:
- determining an access frequency to data in each of said segmented areas; and
- checking variation in said access frequency for each of the segmented areas.

34. The disk cache controlling method as claimed in claim 33, further comprising a step of:
- switching said assignment of said disk cache areas to LRU (least recently used) control in correspondence with said access frequency to data in each of the segmented areas.

35. The disk cache controlling method as claimed in claim 34, further comprising the steps of:
- checking said variation in said access frequency to data in each of the segmented areas; and
- switching said assignment of said disk cache areas to said LRU control if said variation is found to be small.

36. A disk cache controlling method in an information processing device including a disk device in which data is stored and a disk cache, comprising a step of:
- segmenting said disk device into a plurality of areas each having an arbitrary fixed length; and
- assigning, with the higher priority, disk cache areas to said segmented areas within a volume assigned to said disk device, separated farther away from a head initial position of a drive of said disk device.

37. The disk cache controlling method as claimed in claim 36, wherein said disk cache area is assigned with the higher priority to a segmented area positioned on an inner side of said drive of said disk device.

* * * * *